US008423273B2

(12) United States Patent  
Mineta

(10) Patent No.: US 8,423,273 B2  
(45) Date of Patent: Apr. 16, 2013

(54) MINIMUM ENERGY ROUTE FOR A MOTOR VEHICLE

(75) Inventor: Kenichi Mineta, Rancho Palos Verdes, CA (US)

(73) Assignee: Honda Motor Co., Ltd., Tokyo (JP)

(*) Notice: Subject to any disclaimer, the term of this patent is extended or adjusted under 35 U.S.C. 154(b) by 370 days.

(21) Appl. No.: 12/749,838

(22) Filed: Mar. 30, 2010

(65) Prior Publication Data

US 2011/0246004 A1 Oct. 6, 2011

(51) Int. Cl.
*G06F 19/00* (2011.01)
*B60L 9/00* (2006.01)

(52) U.S. Cl.
USPC .................. 701/123; 701/22; 701/461

(58) Field of Classification Search .......... None
See application file for complete search history.

(56) References Cited

U.S. PATENT DOCUMENTS

| | | | |
|---|---|---|---|
| 5,845,227 A | 12/1998 | Peterson | |
| 7,206,761 B2* | 4/2007 | Colvin | 705/35 |
| 7,360,615 B2 | 4/2008 | Salman et al. | |
| 7,376,604 B1* | 5/2008 | Butcher | 705/35 |
| 7,539,562 B2* | 5/2009 | Maguire et al. | 701/22 |
| 8,014,914 B2* | 9/2011 | Boss et al. | 701/22 |
| 8,036,785 B2* | 10/2011 | Maguire et al. | 701/22 |
| 8,185,302 B2* | 5/2012 | Schunder | 701/408 |
| 2004/0117113 A1 | 6/2004 | Friedrichs et al. | |
| 2005/0228553 A1 | 10/2005 | Tryon | |
| 2006/0278449 A1 | 12/2006 | Torre-Bueno | |
| 2007/0208467 A1* | 9/2007 | Maguire et al. | 701/22 |
| 2007/0265772 A1* | 11/2007 | Geelen | 701/208 |
| 2008/0021628 A1 | 1/2008 | Tryon | |
| 2008/0027639 A1 | 1/2008 | Tryon | |
| 2008/0051977 A1 | 2/2008 | Tryon | |
| 2008/0133120 A1* | 6/2008 | Romanick | 701/123 |
| 2008/0262668 A1 | 10/2008 | Yamada | |
| 2008/0270016 A1* | 10/2008 | Proietty et al. | 701/123 |
| 2008/0319596 A1 | 12/2008 | Yamada | |
| 2008/0319597 A1 | 12/2008 | Yamada | |
| 2009/0182463 A1* | 7/2009 | Maguire et al. | 701/22 |
| 2010/0049397 A1* | 2/2010 | Liu et al. | 701/33 |
| 2010/0145609 A1* | 6/2010 | Boss et al. | 701/202 |
| 2011/0040438 A1* | 2/2011 | Kluge et al. | 701/29 |
| 2011/0153127 A1* | 6/2011 | Weslati et al. | 701/22 |

FOREIGN PATENT DOCUMENTS

| | | |
|---|---|---|
| DE | 19831487 | 3/2000 |
| FR | 2811268 | 1/2002 |
| JP | 2001197608 | 7/2001 |
| JP | 2001314004 | 11/2001 |
| JP | 2007312581 | 11/2007 |
| JP | 2008249588 | 10/2008 |
| WO | 2008093454 | 8/2008 |

OTHER PUBLICATIONS

Office Action mailed Sep. 9, 2011 in U.S. Appl. No. 12/465,308.
Response to Office Action filed Dec. 21, 2011 in U.S. Appl. No. 12/465,308.

* cited by examiner

*Primary Examiner* — Mussa A Shaawat
(74) *Attorney, Agent, or Firm* — Plumsea Law Group, LLC

(57) ABSTRACT

Minimum energy routes for a motor vehicle are determined. The minimum energy routes can be calculated using an energy map. Energy management information is determined and provided along the minimum energy route.

17 Claims, 19 Drawing Sheets

BATTERY CHARGE/DISCHARGE TABLE

| SEGMENT | 0-9m/h | 10-19m/h | ... |
|---|---|---|---|
| A | 0.3kwh | 0.5kwh | |
| B | 0.25kwh | 0.44kwh | |
| ⋮ | | | |

FIG. 6

FUEL CONSUMPTION TABLE

| SEGMENT | 0-9m/h | 10-19m/h | ... |
|---|---|---|---|
| A | 3cc | 5cc | |
| B | 25cc | 44cc | |
| ⋮ | | | |

FIG. 7

ENERGY MANAGEMENT INFORMATION TABLE

| SEGMENT | ELECTRIC MOTOR CHARGE/DISCHARGE | SLOPE | CONGESTION | FUEL USE |
|---|---|---|---|---|
| A | +1 UNIT | NONE | NONE | -1 UNIT |
| B | +1 UNIT | NONE | NONE | -1 UNIT |
| C | +5 UNITS | DOWN | LOW | -2 UNITS |
| D | -2 UNITS | UP | MEDIUM | -1 UNIT |
| E | -1 UNIT | UP | NONE | -1 UNIT |
| F | +1 UNIT | NONE | NONE | -1 UNIT |

MINIMUM ENERGY ROUTE FOR A MOTOR VEHICLE

BACKGROUND

The embodiments relate generally to a motor vehicle, and in particular to minimum energy routes for a motor vehicle.

Modern vehicles use navigation systems to determine fastest routes for traveling between a starting point and a destination. These systems use mapping information to determine routes that minimize distance or travel time. However, there is a growing need for systems that are capable of determining routes that are optimized to reduce emissions and save energy.

SUMMARY

The term "motor vehicle" as used throughout the specification and claims refers to any moving vehicle that is capable of carrying one or more human occupants and is powered by any form of energy. The term "motor vehicle" includes, but is not limited to: cars, trucks, vans, minivans, SUVs, motorcycles, scooters, boats, personal watercraft, and aircraft.

In some cases, the motor vehicle includes one or more engines. The term "engine" as used throughout the specification and claims refers to any device or machine that is capable of converting energy. In some cases, potential energy is converted to kinetic energy. For example, energy conversion can include a situation where the chemical potential energy of a fuel or fuel cell is converted into rotational kinetic energy or where electrical potential energy is converted into rotational kinetic energy. Engines can also include provisions for converting kinetic energy into potential energy. For example, some engines include regenerative braking systems where kinetic energy from a drivetrain is converted into potential energy. Engines can also include devices that convert solar or nuclear energy into another form of energy. Some examples of engines include, but are not limited to: internal combustion engines, electric motors, solar energy converters, turbines, nuclear power plants, and hybrid systems that combine two or more different types of energy conversion processes.

In one aspect, a method of operating a navigation system may include the following steps. The method may begin by receiving a minimum energy route request from an electronic control unit of a motor vehicle. The request may include a starting location and an ending location. In another step, the method may retrieve information from an energy map. The energy map may include charge and discharge information related to a battery of the motor vehicle. In another step, the method may calculate a minimum energy route between the starting location and the ending location using the energy map. In another step, the method may send information related to the minimum energy route to the electronic control unit.

In another aspect, a method for operating a motor vehicle may include the following steps. The method may begin by receiving a starting location and an ending location. In another step, the method may retrieve information from an energy map, the energy map including charge and discharge information related to a battery of the motor vehicle. In another step, the method may calculate a minimum energy route between the starting location and the ending location using the energy map. In another step, the method may provide directions to the user for guiding the vehicle to the ending location along the minimum energy route.

In another aspect, a method of operating a navigation system may include the following steps. The method may begin by receiving a minimum energy route request from an electronic control unit of a motor vehicle. The request may include a starting location and an ending location. In another step, the method may retrieve information from an energy map, where the energy map includes energy information related to a first power source and a second power source. The second power source may be different from the first power source. In another step, the method may calculate a minimum energy route between the starting location and the ending location that minimizes the energy consumed by the first power source and the second power source. In another step, the method may send information related to the minimum energy route to the electronic control unit.

In another aspect, a method of operating a motor vehicle may include the following steps. The method may begin by receiving a starting location and an ending location and retrieving information from an energy map. The energy map may include energy information related to a plurality of different power sources. In another step, the method may calculate a minimum energy route between the starting location and the ending location that minimizes the energy consumed by at least one of the power sources of the plurality of different power sources. In another step, the method may provide directions to the user for guiding the vehicle to the ending location along the minimum energy route.

In another aspect, a method of operating a motor vehicle may include the following steps. The method may begin by receiving navigational information related to a minimum energy route between a starting location and an ending location. In another step, the method may receive energy management information related to the minimum energy route. In another step, the method may provide directions to a user for directing the motor vehicle between the starting location and the ending location along the minimum energy route. In another step, the method may control a gasoline engine and an electric motor of the motor vehicle using the energy management information associated with the minimum energy route.

In another aspect, a method of operating a motor may include the following steps. The method may begin by receiving a starting location and an ending location. In another step, the method may detect an energy level associated with a power source of the motor vehicle. In another step, the method may prepare a navigation request related to a minimum energy route. In another step, the method may submit the navigation request including the starting location, the ending location and the energy level.

In another aspect, a method of operating a navigation system may include the following steps. The method may begin by receiving a minimum energy route request from a navigation unit of a motor vehicle. The request may include a starting location and an ending location. In another step, the method may receive an energy level from the motor vehicle associated with a power source of the motor vehicle. In another step, the method may retrieve information from an energy map, where the energy map includes energy information. In another step, the method may calculate a minimum energy route between the starting location and the ending location using the energy map and the energy level. In another step, the method may send information related to the minimum energy route to the navigation unit.

Other systems, methods, features and advantages of the exemplary embodiments will be, or will become, apparent to one of ordinary skill in the art upon examination of the following figures and detailed description. It is intended that all such additional systems, methods, features and advantages be included within this description and this summary, be within the scope and protected by the claims.

BRIEF DESCRIPTION OF THE DRAWINGS

The exemplary embodiments can be better understood with reference to the following drawings and description. The components in the figures are not necessarily to scale. Moreover, in the figures, like reference numerals designate corresponding parts throughout the different views.

FIG. 6 is a schematic view of an embodiment of a battery charge/discharge table;

FIG. 7 is a schematic view of an embodiment of a fuel consumption table;

DETAILED DESCRIPTION

Figure 1:
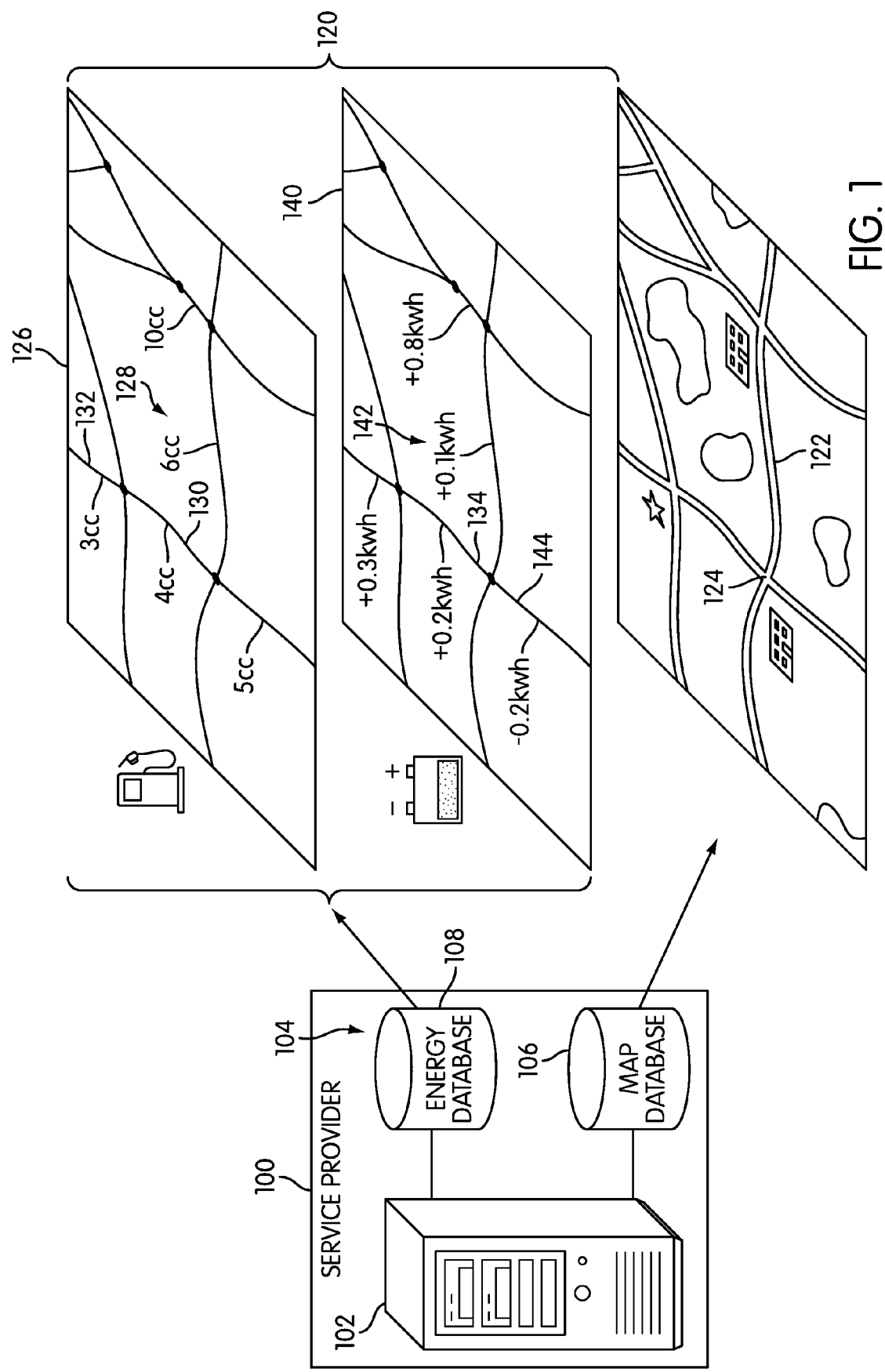
FIG. 1 is a schematic view of an embodiment of a service provider including an energy map.

FIG. 1 illustrates a schematic diagram of an embodiment of a service provider 100 that is configured to communicate with a motor vehicle. In some embodiments, service provider 100 can include a computer system 102 and databases 104 in communication with computer system 102. The term "computer system" refers to the computing resources of a single computer, a portion of the computing resources of a single computer, and/or two or more computers in communication with one another, also any of these resources can be operated by one or more human users. In one embodiment, computer system 102 includes a server.

Computer system 102 may communicate with databases 104. Databases 104 can include any kind of storage device, including but not limited to: magnetic, optical, magneto-optical, and/or memory, including volatile memory and non-volatile memory. In some embodiments, databases 104 may be integral with computer system 102. In other embodiments, databases 104 are separate from computer system 102 and communicate with computer system 102.

Databases 104 can comprise any number of databases. In some cases, databases 104 can include map database 106. In some embodiments, map database 106 may be used to store navigation information. The term "navigation information" refers to any information that can be used to assist in determining a location or providing directions to a location. Some examples of navigation information include street addresses, street names, street or address numbers, apartment or suite numbers, intersection information, points of interest, parks, any political or geographical subdivision including town, township, province, prefecture, city, state, district, ZIP or postal code, and country. Navigation information can also include commercial information including business and restaurant names, commercial districts, shopping centers, and parking facilities. Navigation information can also include geographical information, including information obtained from any Global Navigational Satellite infrastructure (GNSS), including Global Positioning System or Satellite (GPS), Glonass (Russian) and/or Galileo (European). The term "GPS" is used to denote any global navigational satellite system. Navigation information can include one item of information, as well as a combination of several items of information.

Service provider 100 may be configured to store energy map 120. The term "energy map" as used throughout this detailed description and in the claims refers to any map, table, or other data structure that includes location based energy information. An energy map can provide information about the use or transformation of various types of energy as a motor vehicle travels on various roadways. An energy map is not limited to a particular type of energy and may include, but is not limited to: information about chemical energy, electrical energy, mechanical energy, nuclear energy as well as other types of energy. More specifically, an energy map can be configured to store energy information related to the use of various different power sources that could be used to power a motor vehicle. Examples of different power sources include, but are not limited to: rechargeable energy storage systems, electricity, electrochemical devices (including batteries), combustible fuels such as hydrocarbons, fuels configured for use in fuel cells, wind, natural gas, solar power, liquid nitrogen, compressed air as well as any other power sources or energy sources. Furthermore, these different power sources can be converted to different forms of energy using power plants such as combustion engines, electric motors, fuel cells, turbines, solar panels, as well as other power plants. In particular, in a motor vehicle, these power sources can be converted to mechanical and electrical energy using one or more power plants such as a combustion engine and/or an electric motor. In some cases, the term power source can be used to describe a power plant and its associated power source.

Generally, energy map 120 can be associated with information from one or more databases. For example, in the current embodiment, energy map 120 includes information from map database 106 as well as information from energy database 108. In other embodiments, however, a single database may store both geographical information and energy information. In still other embodiments, energy map 120 may be associated with information from three or more separate databases.

Energy map 120 includes navigation information. In the current embodiment, each of the possible routes of travel are divided into a finite number of roadway segments 122 that are connected by roadway nodes 124. Furthermore, each roadway segment of roadway segments 122 may be associated with energy information regarding the amount of energy used, transformed or recharged as a motor vehicle travels along the roadway segment. The current embodiment illustrates two examples of energy information that can be associated with an energy map: gasoline consumption information 126 and electrical charge/discharge information 140.

Gasoline consumption information 126 comprises gasoline consumption values 128 along each of roadways segments 122. For example, in this embodiment, roadway segment 130 is associated with a value of 4 cc (cubic centimeters). This value indicates that motor vehicles traveling on roadway segment 130 may use approximately 4 cc of gasoline. Likewise, roadway segment 132 is associated with a value of 3 cc, which indicates that a motor vehicle traveling on roadway segment 132 uses approximately an average of 3 cc of gasoline. With this arrangement, gasoline consumption information 126 provides a method of estimating the total amount of fuel that may be consumed along a specified route comprising a plurality of roadway segments 122.

Electrical charge/discharge information 140 comprises electrical charge/discharge values 142 along roadway segments 122. For example, in the current embodiment, roadway segment 134 is associated with a discharge value of 0.2 (kWh) kilowatt hours. In other words, a motor vehicle traveling along roadway segment 134 using electrical power will use approximately an average of 0.2 kWh of electrical energy. As another example, roadway segment 144 is associated with a charge value of −0.2 kWh. This value indicates a motor vehicle traveling along roadway segment 144 will gain approximately an average of 0.2 kWh of electrical energy. In other words, as a motor vehicle travels along roadway segment 144, the electric battery may be recharged as some other form of energy (such as gravitational potential energy) is transformed into electrical or chemical energy stored within an electric battery. With this arrangement, electrical charge/discharge information 140 provides a method of estimating the total amount of electrical energy that may be consumed or gained along a specified route comprising a plurality of roadway segments.

Although the current embodiment only illustrates two types of energy information, other embodiments could include additional types of energy information. For example, in some cases, an energy map could include hydrogen energy information related to the amount of hydrogen fuel that may be consumed on roadway segments by a motor vehicle that is powered with hydrogen fuel cells. In still another embodiment, an energy map could include nuclear energy information related to the amount of nuclear fuel that may be consumed on roadway segments by a motor vehicle that is powered by nuclear energy.

In different embodiments, an energy map may store information related to energy consumption as well as energy transformation or energy recharging. As discussed above, an electric battery in a motor vehicle may be recharged while traveling down a hill, and therefore some roadway segments may be associated with energy recharging values rather than energy consumption values. Some types of energy cannot be recharged while driving (such as fuels that must be refilled at stations), and therefore these types of energy will always be associated with energy consumption values. In some cases, positive and negative values can be used to distinguish between energy consumption values and energy recharging or energy restoring values. For example, in the current embodiment, positive values of energy map 120 correspond to energy consumption values while negative values correspond to energy recharging values.

It will be understood that FIG. 1 is only intended to schematically illustrate an energy map. In some cases, an energy map may be stored as a table that associates energy information with different roadway segments. In other cases, an energy map may be stored in any other form. In other words, an energy map may not include visually displayed information but may instead only comprise various collections of data stored in one or more databases.

A service provider can include provisions for determining energy information that may be used to make an energy map. In some embodiments, a service provider can measure energy increases or decreases associated with one or more power sources on various roadways. In some cases, one or more probe vehicles can measure energy information along various roadway segments.

Figure 2:
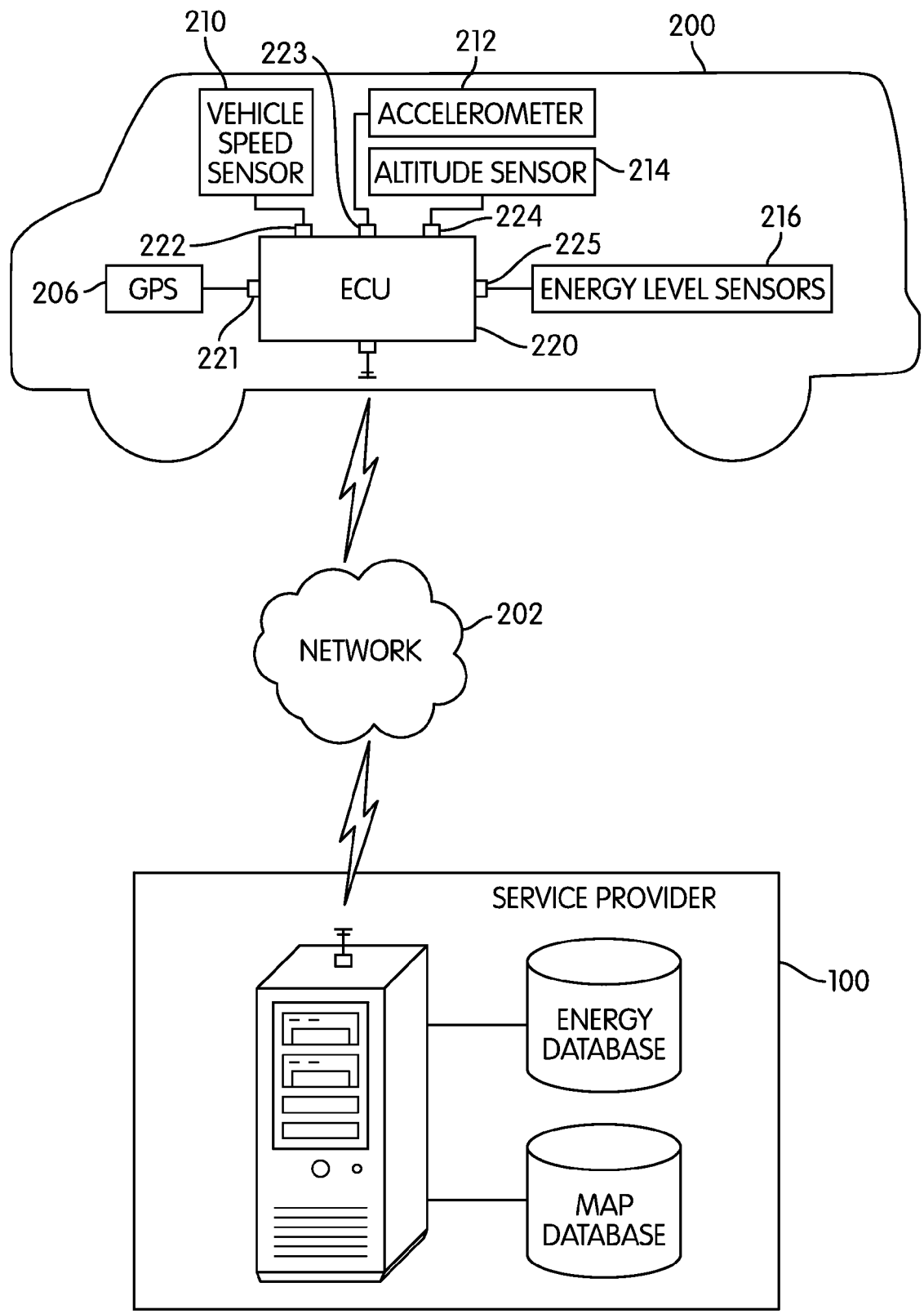
FIG. 2 is a schematic view of an embodiment of a probe vehicle in communication with a service provider.

FIG. 2 illustrates an embodiment of probe vehicle 200 in communication with service provider 100. In some embodiments, probe vehicle 200 may communicate with service provider 100 using network 202. In some cases, network 202 can be any kind of wireless network, including but not limited to any cellular telephone network using, for example, any one of the following standards: CDMA, TDMA, GSM, AMPS, PCS, analog, and/or W-CDMA. In other embodiments, probe vehicle 200 may not communicate wirelessly with service provider 100. Instead, in some cases, probe vehicle may gather information remotely and then a physical connection can be established between probe vehicle 200 and service provider 100 to transfer information between them.

Probe vehicle 200 can be any type of motor vehicle that is configured to travel on one or more roadways. For purposes of clarity, only some components of probe vehicle 200 are shown. Furthermore, in other embodiments, additional components can be added or removed.

Probe vehicle 200 can include provisions for receiving GPS information. In some cases, probe vehicle 200 can include GPS receiver 206. In an exemplary embodiment, GPS receiver 206 can be used for gathering GPS information for any systems of a probe vehicle, including, but not limited to: GPS based navigation systems.

Probe vehicle 200 can include one or more sensors for determining various operating conditions of a motor vehicle or for determining characteristics of an environment of a motor vehicle. In one embodiment, probe vehicle 200 may include vehicle speed sensor 210 that is capable of determining the speed of probe vehicle 200. Generally, any type of vehicle speed sensor known in the art can be used. In addition, probe vehicle 200 can include accelerometer 212 that is configured to detect g forces, as well as other types of acceleration. Furthermore, probe vehicle 200 can include altitude sensor 214 for detecting the altitude of probe vehicle 200. Probe vehicle 200 can also include energy level sensors 216 for detecting the levels of various types of power sources. Examples of energy level sensors are discussed in detail below.

Probe vehicle 200 may include provisions for communicating, and in some cases controlling, the various components associated with probe vehicle 200. In some embodiments, probe vehicle 200 may be associated with a computer or similar device. In the current embodiment, probe vehicle 200 may include electronic control unit 220, hereby referred to as ECU 220. In one embodiment, ECU 220 may be configured to communicate with, and/or control, various components of probe vehicle 200. In addition, in some embodiments, ECU 220 may be configured to control additional components of a probe vehicle that are not shown.

ECU 220 may include a number of ports that facilitate the input and output of information and power. The term "port" as used throughout this detailed description and in the claims refers to any interface or shared boundary between two conductors. In some cases, ports can facilitate the insertion and removal of conductors. Examples of these types of ports include mechanical connectors. In other cases, ports are interfaces that generally do not provide easy insertion or removal. Examples of these types of ports include soldering or electron traces on circuit boards.

All of the following ports and provisions associated with ECU 220 are optional. Some embodiments may include a given port or provision, while others may exclude it. The following description discloses many of the possible ports and provisions that can be used, however, it should be kept in mind that not every port or provision must be used or included in a given embodiment.

In some embodiments, ECU 220 can include port 221 for communicating with GPS receiver 206. In particular, ECU 220 may be configured to receive GPS information from GPS receiver 206. In addition, ECU 220 can include port 222, port 223, port 224 and port 225 for communicating with vehicle speed sensor 210, accelerometer 212, altitude sensor 214 and energy level sensors 216, respectively. With this arrangement ECU 220 can receive information from these various sensors for determining the operating parameters of probe vehicle 200. In other embodiments, probe vehicle 200 can include provisions for communicating with additional components that are not illustrated in the current embodiment.

Figure 3:
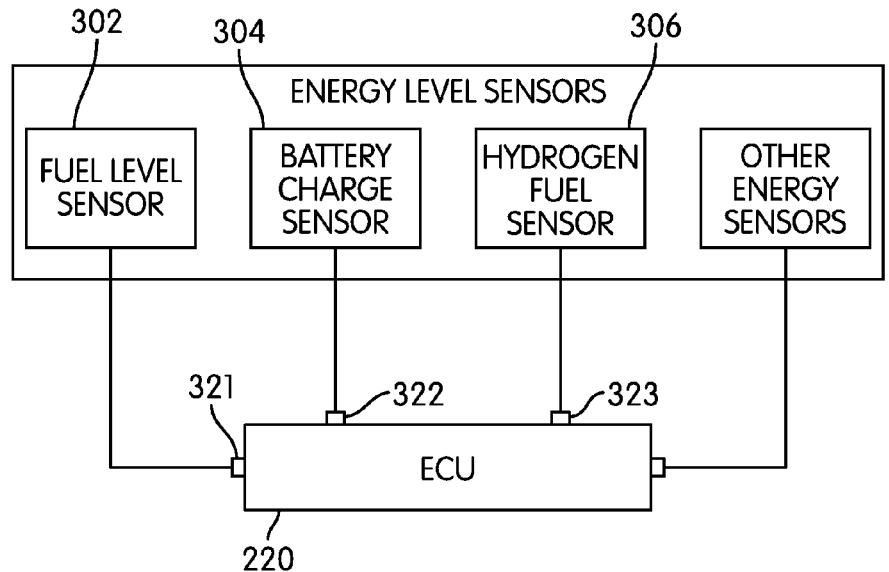
FIG. 3 is a schematic view of an embodiment of a set of energy level sensors for a motor vehicle.

FIG. 3 illustrates an embodiment of various energy level sensors that could be associated with ECU 220. In some embodiments, ECU 220 can be in communication with fuel level sensor 302 via port 321. Generally, fuel level sensor 302 can be any type of sensor configured to measure the amount of liquid fuel in a fuel tank. For example fuel level sensor 302 can be any known sensor for detecting the amount of gasoline in a gas tank. In some cases, fuel level sensor 302 can detect the amount of a mixed fuel in a fuel tank. The term "mixed fuel" as used throughout this detailed description and in the claims, applies to a mixture of two or more fuels. For example, in some cases, a mixed fuel may be a mixture of gasoline and ethanol. Generally, mixtures of gasoline and ethanol can include different proportions of ethanol including, but not limited to: E20, E75 and E80. In other cases, fuel level sensor 302 can detect the levels of any other types of mixed fuels including, but not limited to: methanol and gasoline mixtures, p-series fuels as well as other mixed fuels.

ECU 220 may be in communication with battery charge sensor 304 via port 322. Battery charge sensor 304 may be any sensor capable of determining the state of charge of a battery. Generally, battery charge sensor 304 may be configured to operate with any type of battery including, but not limited to: lead-acid batteries, Nickel Cadmium (NiCd) batteries, Nickel metal hydride (NiMH) batteries, lithium-ion batteries, Lithium-ion polymer batteries, nickel-zinc batteries, zinc-air batteries and molten salt batteries, as well as any other type of batteries known in the art for use with electric vehicles and/or hybrids.

ECU 220 may be in communication with hydrogen fuel sensor 306 via port 323. Hydrogen fuel sensor 306 may be any sensor capable of determining the amount of hydrogen in a hydrogen fuel cell. Additionally, ECU 220 may be in communication with any other kind of energy sensor via additional ports. As an example, in other embodiments, ECU 220 may be in communication with energy sensors capable of detecting fuel levels in various types of fuel cells using different types of fuels. In still other embodiments, ECU 220 may be in communication with a nuclear energy sensor.

Generally, the type of energy level sensors used will depend on the types of power sources configured to power probe vehicle 200. In other words, in situations where probe vehicle 200 is equipped with a gasoline tank for running an engine and a battery for powering an electric motor, probe vehicle 200 may include fuel level sensor 302 and batter charge sensor 304. Likewise, in situations where probe vehicle 200 is equipped with a hydrogen fuel cell for powering a motor, probe vehicle 200 may include hydrogen fuel sensor 306.

It should be understood that although the current embodiment discusses a probe vehicle that is used for measuring energy information on various roadways, in other embodiments energy information measurements could be made by any vehicle capable of: detecting energy use and/or energy transformation in one or more power sources; determining the location information associated with the energy information measurements and submitting the measurements and locations to a service provider. For example, in another embodiment, motor vehicles using navigation systems that are in communication with a service provider can be configured to take energy information measurements and submit the measurements along with current position information to the service provider. Typically, vehicles with different types of power sources will already be equipped with energy sensors for detecting the amount of stored energy, such as a fuel level in a fuel cell or a state of charge in a battery. With this alternative arrangement, a service provider does not need to send out dedicated probe vehicles to determine location based energy consumption information.

It will also be understood that an energy map can be created using measurements from a single vehicle, or can be created by averaging measurements from multiple vehicles. For example, multiple vehicles may take energy information measurements on a roadway segment. In some cases, these multiple measurements can be averaged together. In other cases, a single measurement can be used for each roadway segment. Furthermore, in cases where multiple measurements are made by different types of vehicles, the measurements can be stored according to the type of vehicle making the measurement. In other words, in some cases, energy information measurements can be sorted according to vehicle class, make and/or model in order to provide the most accurate estimates for energy consumption or energy transformation (i.e., battery recharging) on various routes.

In some embodiments, to increase efficiency, energy consumption or restoration measured by a vehicle of a particular make and model can be used to estimate the amount of energy that may be consumed or restored by other vehicles of differing makes and/or models. For example, in some cases a probe vehicle of a particular make and model may be used to measure energy information on various roadway segments. Rather than dedicating multiple different makes and/or models to measuring energy information along the same roadway segments, the energy information measured by the probe vehicle can be used to estimate the amount of energy consumption or restoration that would be experienced by other vehicles of different makes and/or models. In some cases, this could be achieved by multiplying the measured energy information by various numerical factors that correspond to different makes and/or models.

Figure 4:
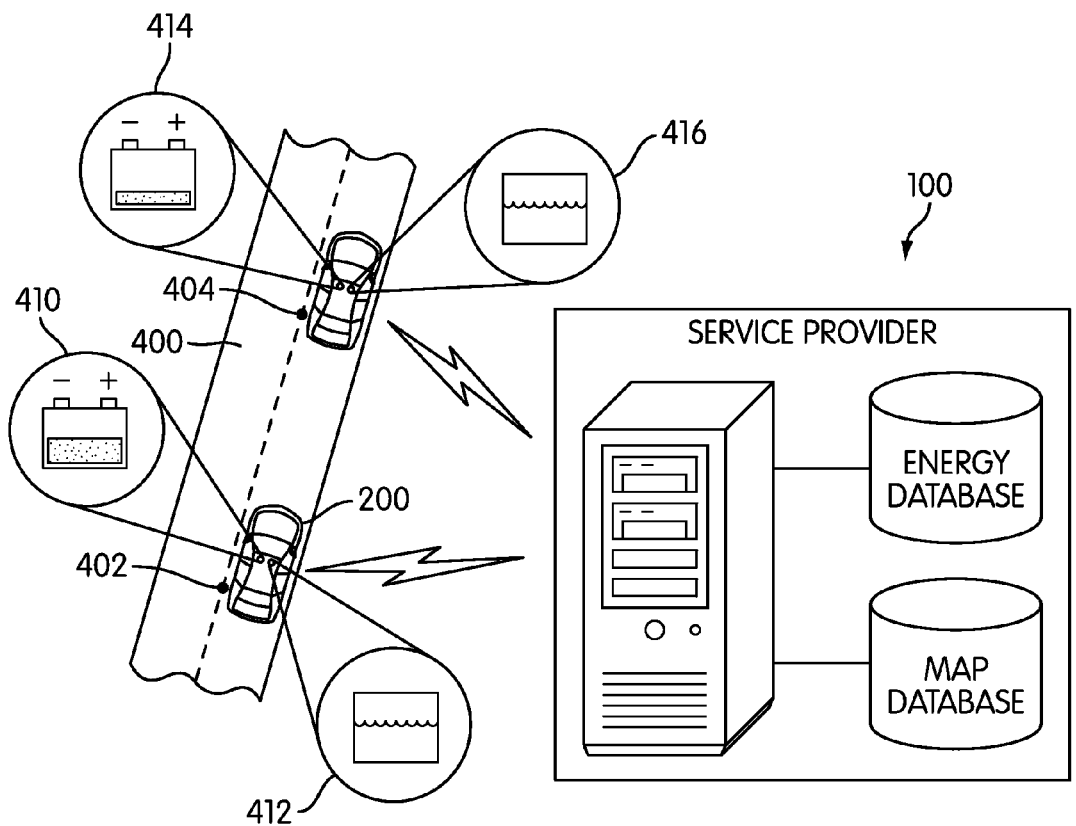
FIG. 4 is a schematic view of an embodiment of a probe vehicle making energy level measurements.

FIG. 4 illustrates a schematic view of an embodiment of a probe vehicle configured to measure energy information. Referring to FIG. 4, probe vehicle 200 is traveling on roadway 400. Furthermore, probe vehicle 200 may be in communication with service provider 100. At first location 402, probe vehicle 200 measures first state of charge 410. In this case, first state of charge 410 corresponds to the state of charge of a battery. In addition, probe vehicle 200 also measures first fuel level 412 at first location 402. In this case, first fuel level 412 corresponds to the fuel level of a gas tank. Probe vehicle 200 may submit information about first state of charge 410, information about first fuel level 412 and information about first location 402 to service provider 100.

At second location 404, probe vehicle 200 may measure second state of charge 414. Second state of charge 414 corresponds to the state of charge of a battery at second location 404. Also, probe vehicle 200 may measure second fuel level 416 at second location 404. Probe vehicle 200 may submit information about second state of charge 414, information about second fuel level 416 and information about second location 404 to service provider 100.

As service provider 100 receives energy information and location information from probe vehicle 200, service provider 100 may calculate energy consumption or energy recharging information corresponding to a particular roadway segment. In particular, service provider 100 may determine an energy level difference as a vehicle travels over a roadway segment. The term "energy level difference" as used throughout this detailed description and in the claims refers to a change in energy levels of a power source between two distinct locations. For example, service provider 100 may take the difference between first state of charge 410 and second state of charge 414 to determine a state of charge difference of the battery on a particular road segment. As previously discussed, for electric batteries, the state of charge can be decreased (battery discharge) or increased (battery recharge). Likewise, service provider 100 may take the difference between first fuel level 412 and second fuel level 416 to determine the change in the fuel level on a particular roadway segment. In other words, the difference between first fuel level 412 and second fuel level 416 gives the amount of fuel consumed on the particular roadway segment.

The current embodiment only illustrates two locations for purposes of clarity, but it may be understood that a probe vehicle may be configured to make energy level measurements at various different locations associated with a plurality of roadway segments. By making energy level measurements at multiple different locations associated with the nodes of various roadway segments, a service provider can determine energy consumption and/or recharging information for multiple roadway segments to be stored in an energy map.

Although the current embodiment only illustrates a probe vehicle measuring two kinds of energy information (the state of charge of a battery and the fuel level of a fuel tank), in other embodiments a probe vehicle could measure any other kind of energy information associated with the storage of different forms of energy for powering a vehicle. In addition, it will be understood that in some cases a probe vehicle may be configured to measure energy information related to a single power source. In other cases, a probe vehicle may measure energy information related to multiple power sources simultaneously. It will also be understood that in order to accurately determine energy consumption or energy recharging information on a roadway segment, a probe vehicle may be configured to operate using only a single power source on the roadway segment. For example, to determine the charge or discharge of an electric battery on a roadway segment, the probe vehicle may travel on the roadway segment using only battery power to prevent inaccurate estimates of electrical consumption information. Likewise, to determine fuel consumption on a roadway segment, the probe vehicle may travel on the roadway segment using only the engine to prevent inaccurate estimates of fuel consumption.

A method of making an energy map can include provisions for sorting energy information according to vehicle speed, since the amount of energy consumed or recharged may vary with the speed of the vehicle. In some cases, a probe vehicle can measure one or more energy levels associated with one or more power sources as well as the vehicle speed at various locations. This information can be used to store energy information as a function of vehicle speed.

Figure 5:
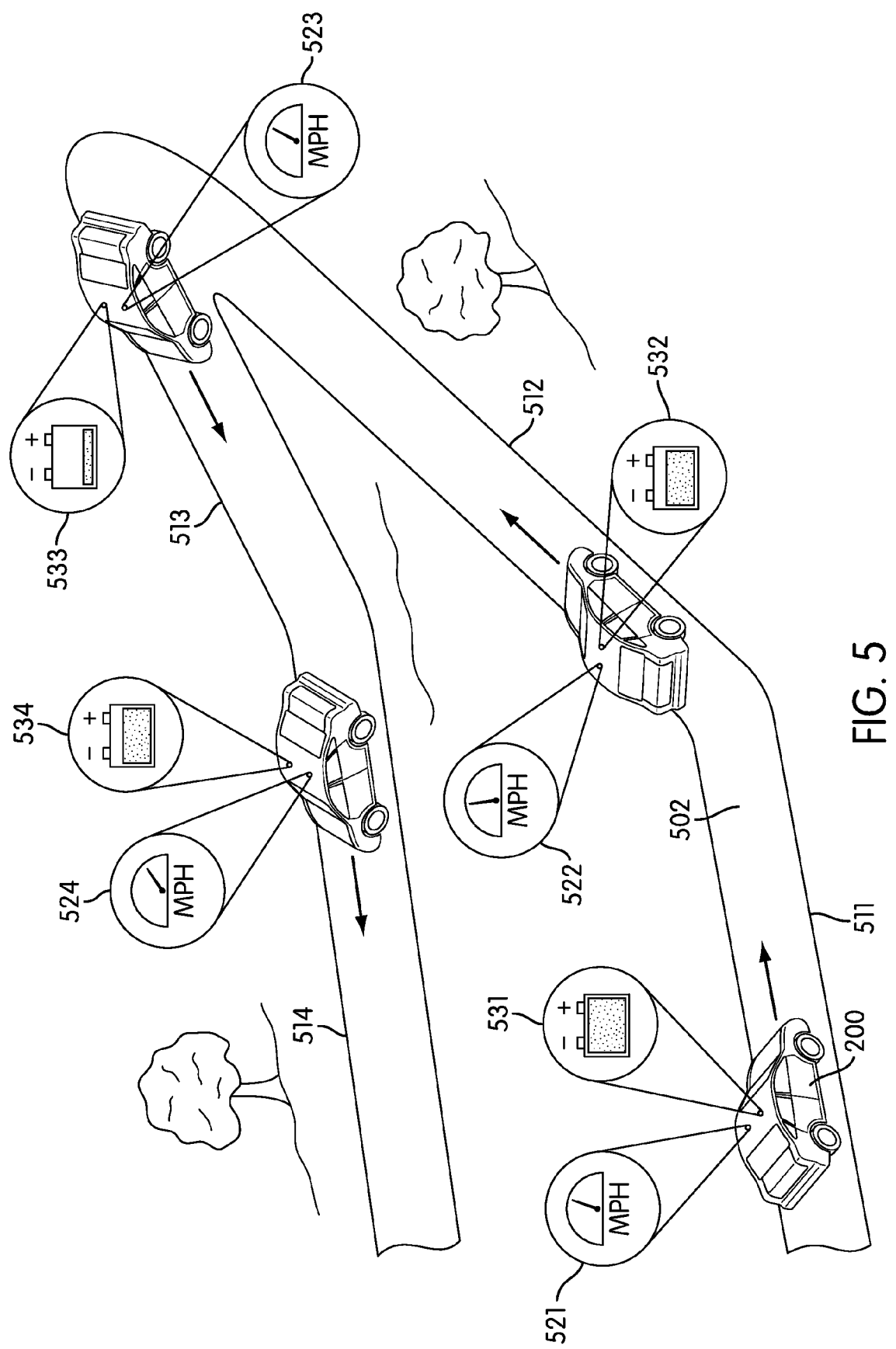
FIG. 5 is a schematic view of an embodiment of a probe vehicle making energy level measurements and vehicle speed measurements.

FIG. 5 illustrates another schematic view of an embodiment of a probe vehicle configured to measure energy information. Referring to FIG. 5, probe vehicle 200 is traveling on roadway 502. In this case, roadway 502 comprises a series of roadway segments. In particular, roadway 502 comprises first roadway segment 511, second roadway segment 512, third roadway segment 513 and fourth roadway segment 514. Furthermore, the slope of each roadway segment varies. Therefore, the amount of energy required to travel across each roadway segment may vary.

Probe vehicle 200 may measure first vehicle speed 521 and first state of charge 531 at the beginning of first roadway segment 511. Upon entering second roadway segment 512, probe vehicle 200 measures second vehicle speed 522 and second state of charge 532. In this case, the difference between second state of charge 532 and first state of charge 531 indicates the amount of energy consumed on first roadway segment 511. Next, upon entering third roadway segment 513, probe vehicle 200 measures third vehicle speed 523 and third state of charge 533. In this case, the difference between third state of charge 533 and second state of charge 532 indicates the amount of energy consumed on second roadway segment 512. Moreover, since second roadway segment 512 has a greater slope than first roadway segment 511, the amount of energy consumed along second roadway segment 512 is substantially greater than the amount of energy consumed on first roadway segment 511. Finally, upon entering fourth roadway segment 514, probe vehicle 200 measures fourth vehicle speed 524 and fourth state of charge 534. In this case, the difference between fourth state of charge 534 and third state of charge 533 indicates the amount of energy recharged on third roadway segment 513. Specifically, since third roadway segment 513 is a down slope, the kinetic energy gained as probe vehicle 200 travels down third roadway segment 513 can be converted into electrochemical energy that is stored within a battery.

For purposes of clarity, roadway segments in the current embodiment are illustrated with approximately equal lengths. In other embodiments, however, it will be understood that the lengths of various roadway segments can vary. Furthermore, the amount of energy consumed (or recharged) on a roadway segment may vary according to various factors such as length, slope, curvature, altitude as well as other factors that could affect the consumption or recharging of energy.

FIG. 6 illustrates a schematic view of an embodiment of a battery charge/discharge table 600. Table 600 comprises rows 602 that correspond to various roadway segments. In addition, table 600 includes columns 604 that correspond to various speed ranges. For example, first column 606 includes charge/discharge values for vehicles traveling between 0 and 9 miles per hour. Likewise, second column 608 includes charge/discharge values for vehicles traveling between 10 and 19 miles per hour. With this arrangement, an estimated charge/discharge value for each roadway segment can be stored as a function of vehicle speed for use in determining routes that minimize energy consumption.

FIG. 7 illustrates a schematic view of an embodiment of fuel consumption table 700. Table 700 comprises rows 702 that correspond to various roadway segments. In addition, table 700 comprises columns 704 that correspond to various speed ranges. For example, first column 706 includes fuel consumption values for vehicles traveling between 0 and 9 miles per hour. Likewise, second column 708 includes fuel consumption values for vehicles traveling between 10 and 19 miles per hour. With this arrangement, an estimated fuel consumption value for each roadway segment can be stored as a function of vehicle speed for use in determining routes that minimize energy consumption.

For purposes of clarity, only some portions of table 600 and table 700 are illustrated in the current embodiment. Generally, each roadway segment in a map database may be associated with a value indicating energy consumption or recharging on that route associated with a particular type of power source. Moreover, the division of energy information values into the particular speed ranges shown here is exemplary and in other embodiments the speed ranges could have any other values. For example, in another embodiment, the speed ranges could comprise irregular increments.

Although the current embodiment uses tables with energy information sorted by speed ranges, in other embodiments energy information could be sorted using other operating parameters that may be directly or indirectly related to fuel consumption. For example, in another embodiment, a probe vehicle could measure average acceleration values over roadway segments and a service provider could build tables so that energy information values are sorted into different acceleration ranges.

It will be understood that table 600 and table 700 could be created in any manner. In some cases, a service provider may use measurements from a single probe vehicle to determine the values in table 600 and table 700. In other cases, a service provider may use an average of a plurality of measurements from multiple probe vehicles to determine the values in table 600 and table 700. Furthermore, the current embodiments illustrate battery charge/discharge tables and fuel consumption tables for a particular type a vehicle (such as vehicle class or vehicle model). In other embodiments, different tables can be used for different vehicle types. For example, in another embodiment, a service provider can include energy information tables for each different class of vehicle including, but not limited to, SUVs, sedans, coupes, hatchbacks, trucks as well as other vehicle types.

Figure 8:
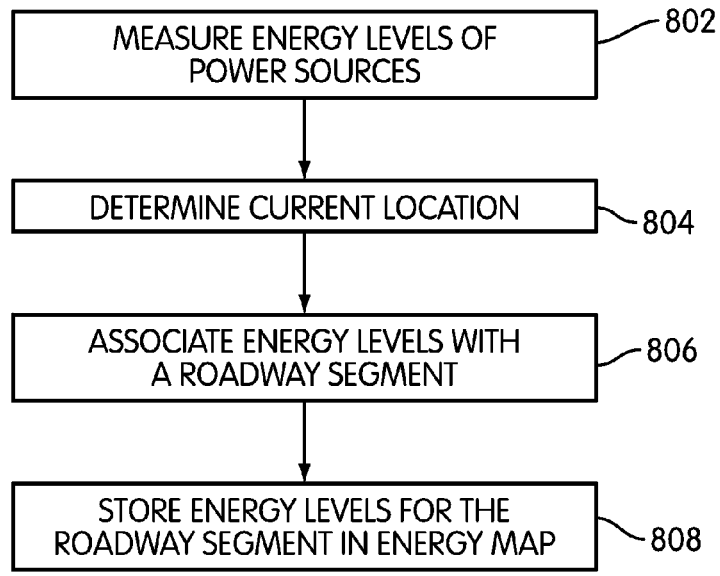
FIG. 8 is an embodiment of a process for making an energy map.

FIG. 8 illustrates an embodiment of a process for making an energy map. In some embodiments, some of the following steps could be accomplished by a probe vehicle, while other steps could be accomplished by a service provider. In other embodiments, however, all of the following steps could be accomplished by a probe vehicle. For example, in another embodiment, a probe vehicle may comprise a computer system with one or more databases for storing information related to an energy map. In other words, the steps of creating an energy map may be completed onboard of a probe vehicle rather than being carried out by a service provider. It will be understood that in other embodiments one or more of the following steps may be optional.

During step 802, a probe vehicle can measure energy levels associated with one or more power sources. In some cases, a probe vehicle can measure multiple energy levels substantially simultaneously. For example, in one embodiment, a probe vehicle can measure fuel levels associated with a gasoline tank as well as state of charge levels of an electrochemical battery. In other cases, a probe vehicle may only measure a single energy level associated with a single energy storage device.

Following step 802, during step 804, a probe vehicle can determine a current location. In particular, in some cases a probe vehicle can determine a current location using GPS information. Next, during step 806, the energy levels can be associated with a particular roadway segment. In some cases, the roadway segment can be selected according to the current location. Moreover, the step of associating the energy levels with a particular roadway segment can be accomplished onboard the probe vehicle or at a service provider.

Once the energy levels have been associated with a roadway segment, the energy levels can be stored in an energy map during step 808. In some cases, the energy levels can be converted into energy difference values that correspond to the energy consumption or energy recharging that occurs on the roadway segment, rather than storing the measured energy levels. With this arrangement, an energy map can be created that can be later used to determine the amount of energy consumed or restored along a particular route.

Figure 9:
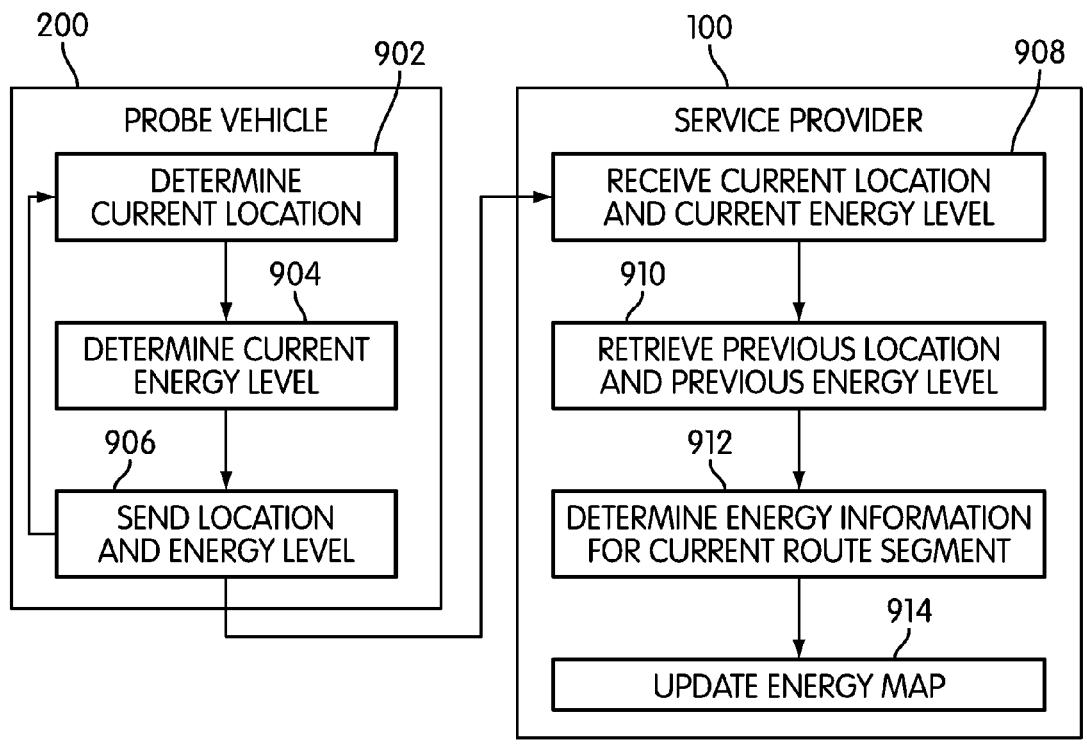
FIG. 9 is an embodiment of a detailed process for making an energy map.

FIG. 9 illustrates an embodiment of a detailed process for making an energy map. In some embodiments, some of the following steps could be accomplished by a probe vehicle, while other steps could be accomplished by a service provider. In other embodiments, however, all of the following steps could be accomplished by a probe vehicle. For example, in another embodiment, a probe vehicle may comprise a computer system with one or more databases for storing information related to an energy map. In other words, the steps of creating an energy map may be completed onboard of a probe vehicle rather than being carried out by a service provider. It will be understood that in other embodiments one or more of the following steps may be optional.

During step 902, probe vehicle 200 may determine a current location. As discussed above, the current location can be determined using GPS information. Next, during step 904, probe vehicle 200 may determine a current energy level. In other words, probe vehicle 200 may measure the energy level associated with a particular power source in the motor vehicle. As an example, probe vehicle 200 could measure the current state of charge of a battery. Following this, during step 906, probe vehicle 200 may send the current location and the current energy level to service provider 100.

Following step 906, during step 908, service provider 100 may receive the current location and the current energy level from probe vehicle 200. As discussed previously, this exchange of information could occur in any manner using wired or wireless technologies. Next, during step 910, service provider 100 may retrieve a previous location and a previous energy level associated with probe vehicle 200. In some cases, probe vehicle 200 is assumed to be constantly transmitting energy level measurements at various locations that correspond to the nodes between roadway segments.

Following step 910, during step 912, service provider 100 may determine energy information for a current route segment. In particular, the current route segment may be a route segment that extends between the previous location and the current location. In addition, the energy information corresponds to the difference between the previous energy level and the current energy level. In other words, the energy information is associated with the amount of energy consumed or recharged along the roadway segment. After step 912, during step 914, the energy map is updated with energy information for the current route segment.

It will be understood that the process discussed with respect to FIG. 9 can be repeated multiple times as a motor vehicle travels over various different roadway segments. This arrangement allows an energy map to be built by associated each of the known roadway segments in a database with energy information that indicates the amount of energy consumed or recharged on the roadway segments. Furthermore, it will be understood that the process discussed here could be repeated in order to determine energy information for different power sources along each roadway segment. For example, the process could be performed a first time to determine energy information related to the charging and discharging of a battery on a roadway segment while the motor vehicle is powered by an electric motor. The process could then be performed a second time to determine energy information related to the consumption of a combustible fuel on a roadway segment while the motor vehicle is powered by a combustion engine. This allows both fuel consumption information and battery charge/discharge information to be stored in an energy map.

A method of making an energy map can also include provisions for storing energy related roadway information. The term "energy related roadway information" as used throughout this detailed description and in the claims refers to properties of a roadway that may contribute to energy loss or transformation. For example, energy consumption is effected by length, slope, curvature, altitude as well as other properties of a roadway. In some cases, a probe vehicle may measure energy related roadway information for a particular roadway segment that is stored in an energy map by a service provider. This information can then be used at a later time to estimate energy consumption or energy recharging along one or more roadway segments. This arrangement allows for increased efficiency by providing a single set of measurements for each roadway segment that can be converted into energy losses or gains according to known properties of various different motor vehicles using different power sources.

Figure 10:
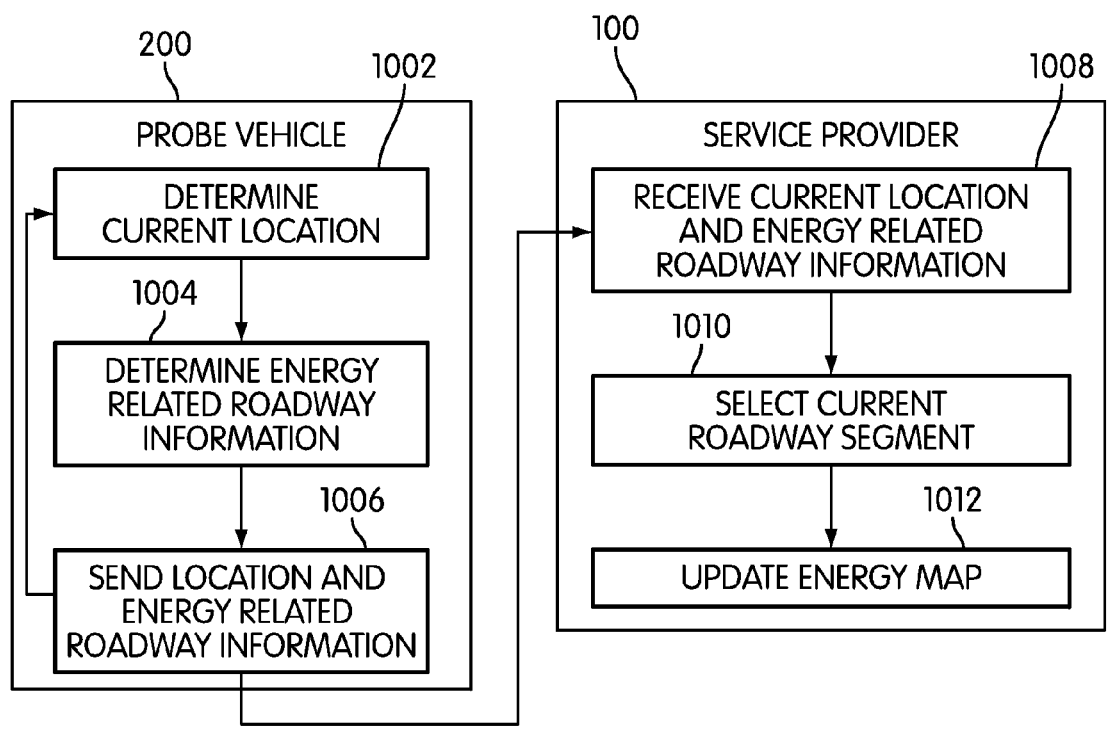
FIG. 10 is another embodiment of a detailed process for making an energy map.

FIG. 10 illustrates an embodiment of a detailed process for making an energy map. In some embodiments, some of the following steps could be accomplished by a probe vehicle, while other steps could be accomplished by a service provider. In other embodiments, however, all of the following steps could be accomplished by a probe vehicle. For example, in another embodiment, a probe vehicle may comprise a computer system with one or more databases for storing information related to an energy map. In other words, the steps of creating an energy map may be completed onboard of a probe vehicle rather than being carried out by a service provider. It will be understood that in other embodiments one or more of the following steps may be optional.

During step 1002, probe vehicle 200 may determine a current location. As discussed above, the current location can be determined using GPS information. Next, during step 1004, probe vehicle 200 may determine energy related roadway information. In other words, probe vehicle 200 may measure various properties of the roadway including slope, altitude, curvature as well as other properties of the roadway that may be used for estimating energy consumption or energy recharging of various power sources. In addition, the length of a particular roadway segment may also be measured where that information is not already stored in a map database. Following this, during step 1006, probe vehicle 200 may send the current location and the energy related roadway information to service provider 100.

Following step 1006, during step 1008, service provider 100 may receive the current location and the energy related roadway information from probe vehicle 200. As discussed previously, this exchange of information could occur in any manner using wired or wireless technologies. Next, during step 1010, service provider 100 may select a current route segment associated with the current location. After step 1010, during step 1020, the energy map is updated with energy related roadway information for the current route segment.

Figure 11:
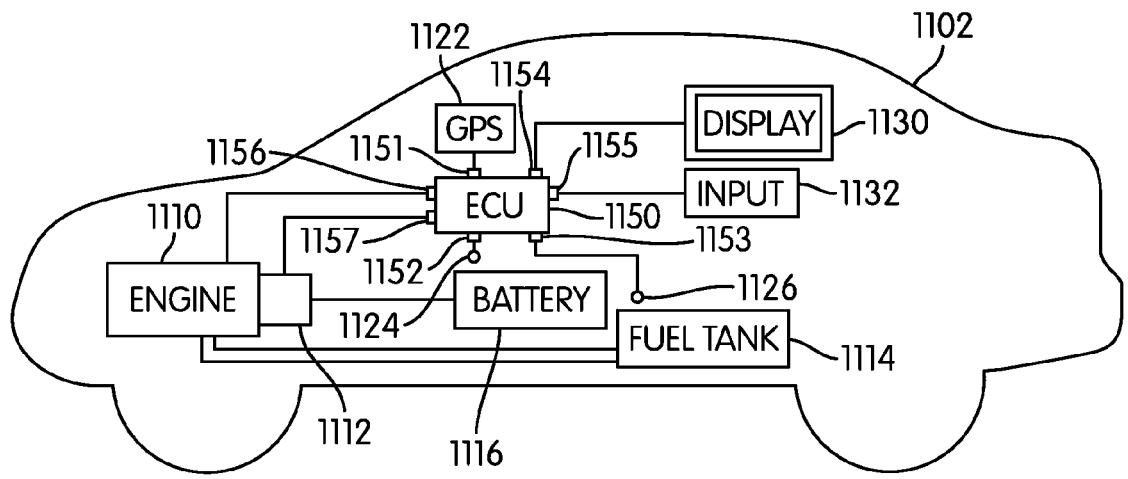
FIG. 11 is a schematic view of an embodiment of a motor vehicle configured to provide navigational information to a user.

FIG. 11 illustrates a schematic view of an embodiment of motor vehicle 1102. Generally, motor vehicle 1102 may be propelled by any power source. In some embodiments, motor vehicle 1102 may be configured as a hybrid vehicle that uses two or more power sources. In an exemplary embodiment, motor vehicle 1102 includes engine 1110 and electric motor 1112. In particular, engine 1110 may generate power using fuel from fuel tank 1114. Likewise, electric motor 1112 may generate electrical energy using battery 1116. In other embodiments, motor vehicle 1102 could include any other power sources.

Engine 1110 and electric motor 1112 may be configured to power motor vehicle 1102 in any manner. In some embodiments, motor vehicle 1102 may use a parallel type of hybrid design. In other embodiments, motor vehicle 1102 may use a series type of hybrid design. In still other embodiments, any known hybrid design can be used for motor vehicle 1102.

Motor vehicle 1102 can include provisions for receiving GPS information. In some cases, motor vehicle 1102 can include GPS receiver 1122. In an exemplary embodiment, GPS receiver 1122 can be used for gathering GPS information for any systems of a probe vehicle, including, but not limited to: GPS based navigation systems.

Motor vehicle 1102 can include one or more sensors for determining various operating conditions of a motor vehicle or for determining characteristics of an environment of a motor vehicle. In one embodiment, motor vehicle 1102 can include battery charge sensor 1124 for sensing the state of charge of battery 1116. Battery charge sensor 1124 can be any type of charge sensor known in the art for detecting the state of charge of a battery. In addition, motor vehicle 1102 can include fuel tank sensor 1126 for sensing the amount of fuel in fuel tank 1114. Fuel tank sensor 1126 can be any type of fuel sensor known in the art for detecting the amount of fuel in a fuel tank. In embodiments where motor vehicle includes other types of power sources, a motor vehicle can also be equipped with various other sensors for detecting the energy levels of each power source.

Motor vehicle 1102 can include provisions for communicating, and in some cases controlling, the various components associated with motor vehicle 1102. In some embodiments, motor vehicle 1102 may be associated with a computer or similar device. In the current embodiment, motor vehicle 1102 may include electronic control unit 1150, hereby referred to as ECU 1150. In one embodiment, ECU 1150 may be configured to communicate with, and/or control, various components of motor vehicle 1102. In addition, in some embodiments, ECU 1150 may be configured to control additional components of a motor vehicle that are not shown.

ECU 1150 may include a number of ports that facilitate the input and output of information and power. The term "port" as used throughout this detailed description and in the claims refers to any interface or shared boundary between two conductors. In some cases, ports can facilitate the insertion and removal of conductors. Examples of these types of ports include mechanical connectors. In other cases, ports are interfaces that generally do not provide easy insertion or removal. Examples of these types of ports include soldering or electron traces on circuit boards.

All of the following ports and provisions associated with ECU 1150 are optional. Some embodiments may include a given port or provision, while others may exclude it. The following description discloses many of the possible ports and provisions that can be used, however, it should be kept in mind that not every port or provision must be used or included in a given embodiment.

ECU 1150 can include port 1151 for communicating with GPS receiver 1122. Additionally ECU 1150 can include port 1152 and port 1153 for communicating with battery charge sensor 1124 and fuel tank sensor 1126, respectively. In order to provide visual information to a user, ECU 1150 can include a display port 1154 that is capable of interacting with a display device 1130. To receive input from a user, ECU 1150 can include an input port 1155. Input port 1155 can communicate with input device 1132. In some embodiments, display device 1130 can also receive input from a user. In some embodiments, display device 1130 includes a touch screen that can receive input and in other embodiments, display device 1130 includes a number of buttons that can receive input. In some embodiments, display device 1130 includes both a touch screen and buttons.

Motor vehicle 1102 can include provisions for controlling one or more power sources. In one embodiment, ECU 1150 may be configured to control engine 1110 and electric motor 1112. In particular, in the current example, ECU 1150 may include port 1156 for communicating with engine 1110 and port 1157 for communicating with electric motor 1112. For purposes of clarity, the connection between ECU 1150 and engine 1110 is shown as a single connection associated with a single port of ECU 1150. However, it will be understood that in some cases, ECU 1150 may be in communication with multiple components that effect the operation of engine 1110 including, but not limited to: fuel injectors, throttle valves, spark plugs, as well as other electrical components that are used for controlling the operating of engine 1110. Furthermore, in some cases, electric motor 1112 may be controlled using a single port, while in other embodiments ECU 1150 can be connected to electric motor 1112 using multiple ports.

In some embodiments, some of the resources associated with ECU 1150 may be configured to operate as a portion of a navigation system. In particular, in some cases, ECU 1150 may be configured to display navigation information on display screen 1130. ECU 1150 may also receive navigation information from GPS receiver 1122. Furthermore, ECU 1150 can receive input from a user from display screen 1130 and/or input device 1132.

Although the current embodiment illustrates a single ECU, in other embodiments multiple control units could be used. For example, in another embodiment, a separate control unit could be used in conjunction with navigation and with controlling one or more power sources in motor vehicle 1102. In other words, in some cases, motor vehicle 1102 could include a dedicated navigation control unit as well as a dedicated power source control unit for controlling one or more power sources in a motor vehicle.

In some embodiments, some of the items shown in FIG. 11 can be a housed in a single case or unit. In other embodiments, the various items shown in FIG. 11 are not housed in a single physical case, but instead, are distributed throughout motor vehicle 1102 and communicate with one another via known wired or wireless methods. For example, in a system where one or more items communicate wirelessly, the Bluetooth® protocol can be used. Furthermore, in some cases, one or more components can communicate with one another using a controller area network within motor vehicle 1102.

Figure 12:
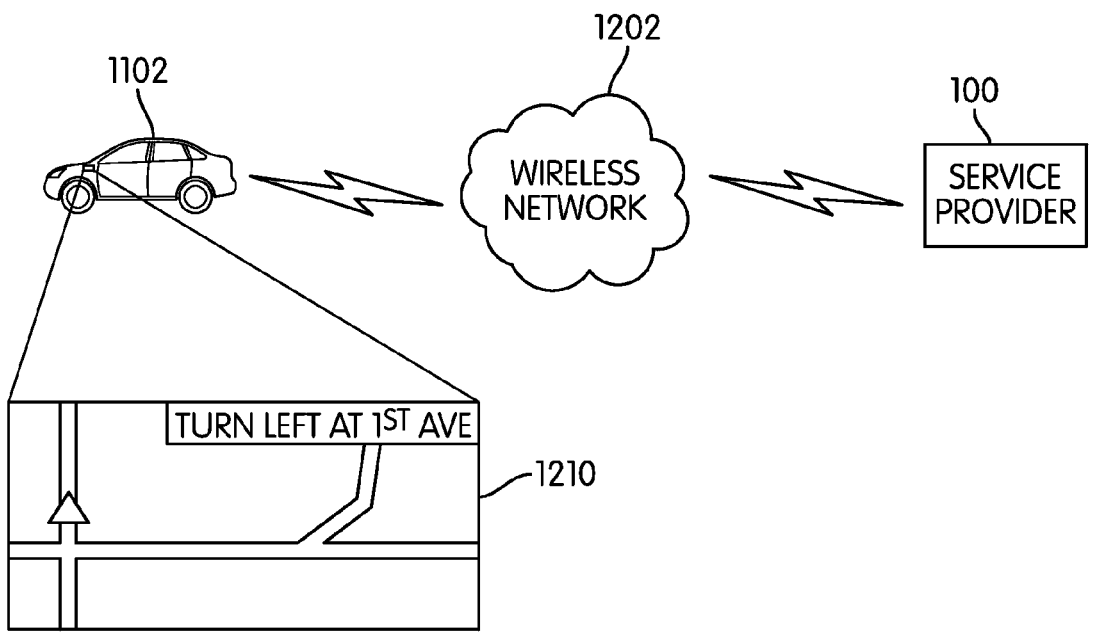
FIG. 12 is a schematic view of an embodiment of a motor vehicle in communication with a service provider through a wireless network.

FIG. 12 illustrates an exemplary embodiment of a system for providing a motor vehicle with navigation information. Referring to FIG. 12, motor vehicle 1102 may be in communicate with service provider 100 using wireless network 1202. Wireless network 1202 can be any kind of wireless network, including but limited to any cellular telephone network using, for example, any one of the following standards: CDMA, TDMA, GSM, AMPS, PCS, analog, and/or W-CDMA.

In an exemplary embodiment, motor vehicle 1102 includes navigation system 1210 for providing navigation information to a user. As an example, in some cases, a user can input a starting location and an ending location (or destination) and navigation system 1210 may provide a route for the user to travel. In the current embodiment, navigation information may be exchanged between motor vehicle 1102 and service provider 100 through wireless network 1202. Moreover, in the exemplary embodiment, navigation system 1210 may serve as a client that relies on service provider 100 for some or all of the processing of the navigation information including determining optimized routes for motor vehicle 1102. However, it will be understood that in other embodiments navigation system 1210 may operate as a standalone system that processes information onboard of motor vehicle 1102. In particular, in some cases, navigation system 1210 could include onboard databases for retrieving map-based information related to finding navigation routes for motor vehicle 1102.

For purposes of understanding the embodiments discussed below, the term "minimum energy route" is used. A minimum energy route may be any route that reduces the energy used by one or more power sources. It should be understood that a minimum energy route may not necessarily refer to a route that reduces the total amount of energy consumed by a motor vehicle, but instead may refer to a route that minimizes the energy consumed by a particular power source associated with the motor vehicle. For example, in some cases, a minimum energy route may refer to a route that minimizes fuel consumption by an engine. In other cases, a minimum energy route may refer to a route that minimizes the amount of electrical energy discharged by a battery used with an electric motor. In still other cases, a minimum energy route may refer to a route that minimizes the total amount of energy consumed by both an engine and an electric motor in the form of fuel and electricity.

Figure 13:
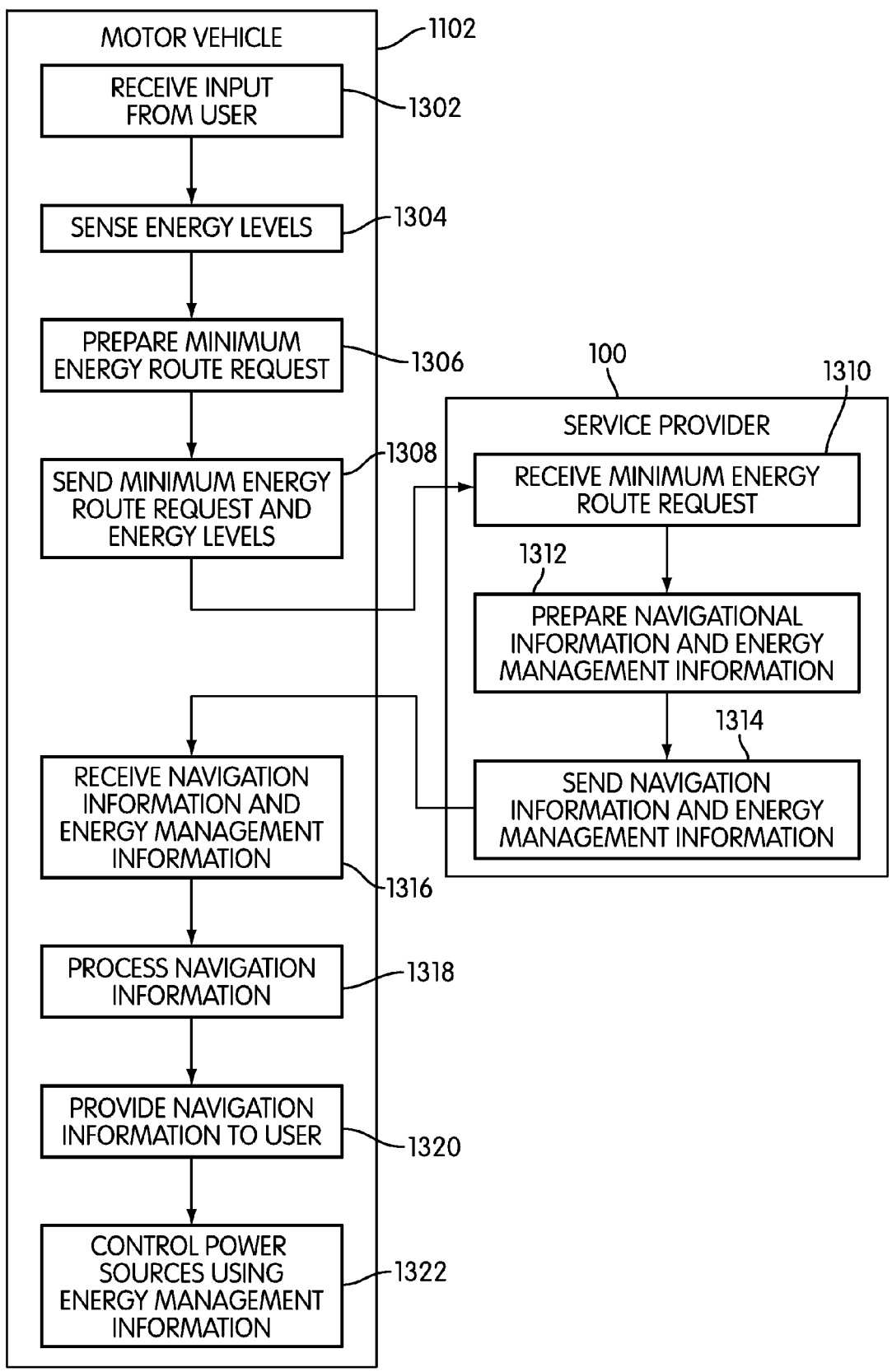
FIG. 13 is an embodiment of a process of obtaining a navigation information and energy management information for a motor vehicle.

FIG. 13 illustrates an embodiment of a process for managing navigation information. In some embodiments, some of the following steps could be accomplished by a motor vehicle, while other steps could be accomplished by a service provider. Specifically, in some cases, steps associated with the motor vehicle could be accomplished by an electronic control unit or any combination of control units or processors of the motor vehicle. In other embodiments, however, all of the following steps could be accomplished by a motor vehicle. For example, in another embodiment, a motor vehicle may comprise a computer system with one or more provisions for calculating a navigational route that is optimized to minimize energy consumption. In other words, the steps of preparing navigational information may be completed onboard of a motor vehicle rather than being carried out by a service provider. It will be understood that in other embodiments one or more of the following steps may be optional.

As shown in FIG. 13, the process begins when an input is received in step 1302. Any form of input can be received in step 1302. In some cases, the input is in the form of one or more buttons being pressed, and/or interaction with a touch screen associated with display device 1130 (see FIG. 11). In some cases, a combination of input from buttons and/or touch screen interaction is received.

It is also possible for voice information to be received in step 1302. Any known speech recognition process or program can be utilized to convert spoken words, phrases and/or numbers into a machine readable format. Preferably, the IBM® embedded Via Voice speech recognition engine is used.

During step 1304, the energy levels of one or more power sources can be sensed. In particular, in some cases, information can be received from one or more energy level sensors. For example, in one embodiment, information related to the amount of fuel in a fuel tank can be received from fuel tank sensor 1126 (see FIG. 11). Likewise, information related to the state of charge of a battery can be received from battery charge sensor 1124 (see FIG. 11). In an embodiment where a fuel cell is used, information can be received from a fuel level sensor that measures the amount of fuel in the fuel cell.

Next, during step 1306, a minimum energy route request can be prepared. In some cases, this step can be performed by ECU 1150 (see FIG. 11). In other cases, a separate navigation control unit can perform this step. After step 1306, the minimum energy route request and the energy levels can be sent during step 1308.

During step 1310, service provider 100 may receive the minimum energy route request. Next, during step 1312, service provider 100 may prepare navigational information and energy management information related to the minimum energy route request. The term "energy management information" as used throughout this detailed description and in the claims refers to any information that may be utilized by a motor vehicle to operate one or more power sources along a preselected route to achieve optimal use of energy. For example, energy management information can include information related to traffic congestion along a predetermined route. Energy management information can also include information related to the slope of a roadway. This energy management information can then be used by a motor vehicle to optimize control of one or more power sources to minimize energy consumption.

During step 1314, service provider 100 may send navigation information and energy management information to motor vehicle 1102. Next, during step 1316, motor vehicle 1102 may receive the navigation information and the energy management information. Following this, during step 1318, motor vehicle 1102 may process the navigation information. In some cases, this step can include recalculating the route selected by the server.

During step 1320, motor vehicle 100 may provide navigation information to a user. In some cases, a navigation route can be provided on display device 1130. In other cases, audible navigation information can be generated to instruct a user on where to turn.

During step 1322, motor vehicle 100 can control one or more power sources using the energy management information. For example, in embodiments including an engine and an electric motor, motor vehicle 1102 can use the energy management information to switch between the engine and the electric motor at various points along the route. This arrangement may help reduce energy consumption by maximizing the use of the electric motor over the engine.

Figure 14:
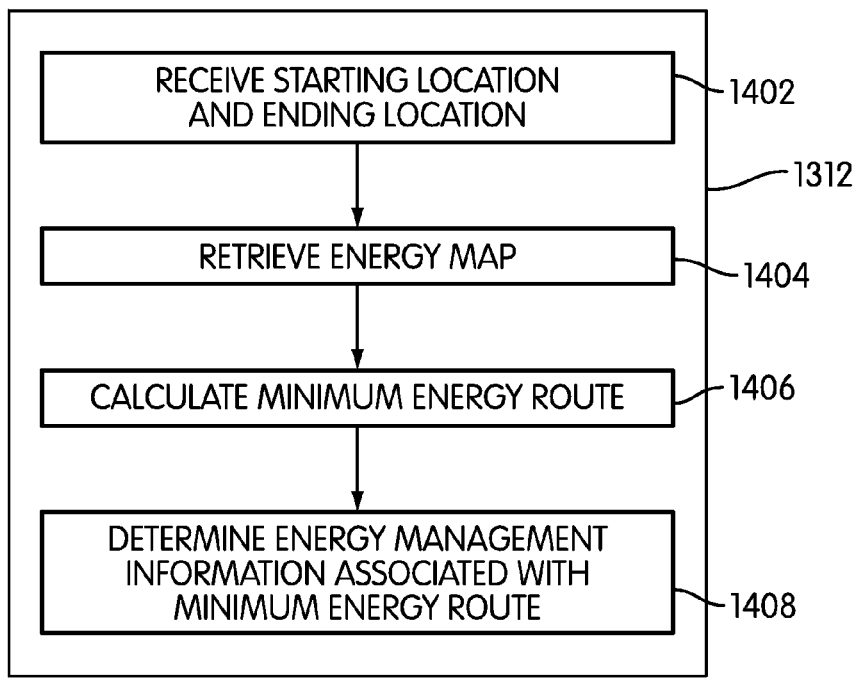
FIG. 14 is an embodiment of a process of preparing navigation information and energy management information.

FIG. 14 illustrates an embodiment of a general process of preparing navigational information and energy management information. Initially, during step 1402, service provider 100 may receive a starting location and an ending location. Next, during step 1404, service provider 100 may retrieve an energy map. As previously discussed, an energy map may be stored in one or more databases associated with service provider 100 and can contain energy information related to one or more power sources for a motor vehicle.

During step 1406, service provider 100 may calculate a minimum energy route. Generally, a minimum energy route can be calculated using any known optimization algorithms. In some cases, a minimum energy route can be calculated by minimizing the amount of energy consumed by a single power source associated with the motor vehicle. In other cases, a minimum energy route can be calculated by minimizing the amount of energy consumed by two or more power sources. During step 1408, service provider 100 may determine energy management information associated with the minimum energy route. In particular, service provider 100 may determine any information that may be utilized by a motor vehicle to control one or more power sources while traveling on a minimum energy route.

Figure 15:
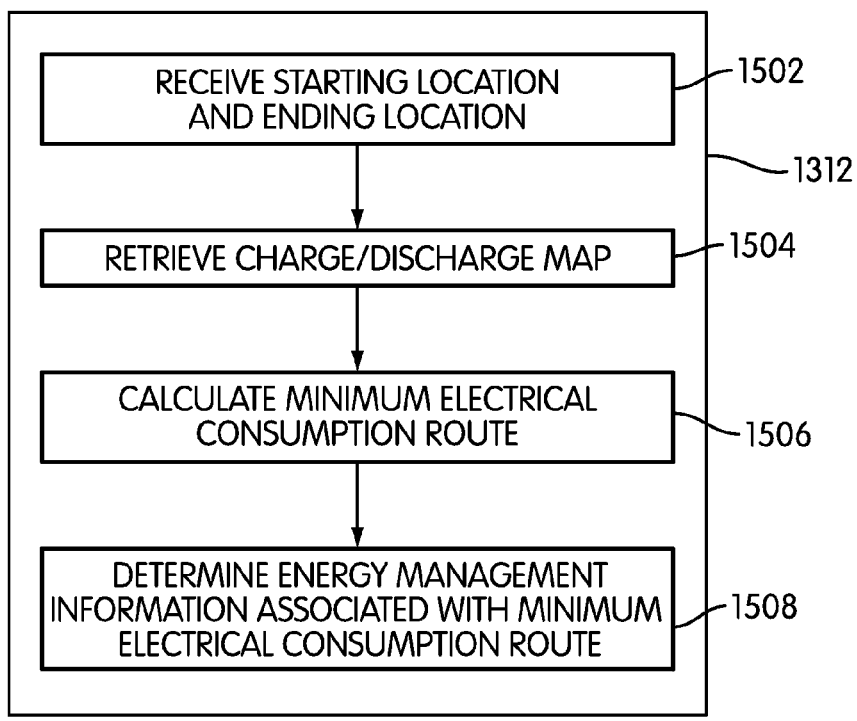
FIG. 15 is another embodiment of a process of preparing navigation information and energy management information.

FIG. 15 illustrates another embodiment of a process of preparing navigational information and energy management information. This particular process may be used in situations where an energy map is a charge/discharge map related to the charge or discharge of a battery along various roadway segments. Initially, during step 1502, service provider 100 may receive a starting location and an ending location. Next, during step 1504, service provider 100 may retrieve a charge/discharge map. As previously discussed, a charge/discharge map may be stored in one or more databases associated with service provider 100 and can contain energy information related to energy discharged or energy recharged by a battery that powers an electric motor.

The method discussed and shown in FIG. 15 can be utilized with hybrid vehicles or electric vehicles including electric motors powered by batteries. For example, this method can be used to determine the minimum electrical consumption route for an electric vehicle between a starting location and an ending location.

During step 1506, service provider 100 may calculate a minimum electrical consumption route that minimizes the amount of electricity discharged by a battery for powering an electric motor. Generally, any known optimization algorithms can be used to calculate a minimum electrical consumption route. During step 1508, service provider 100 may determine energy management information associated with the minimum electrical consumption route. In particular, service provider 100 may determine any information that may be utilized by a motor vehicle to control an electric motor while the motor vehicle travels on the minimum electrical consumption route.

Figure 16:
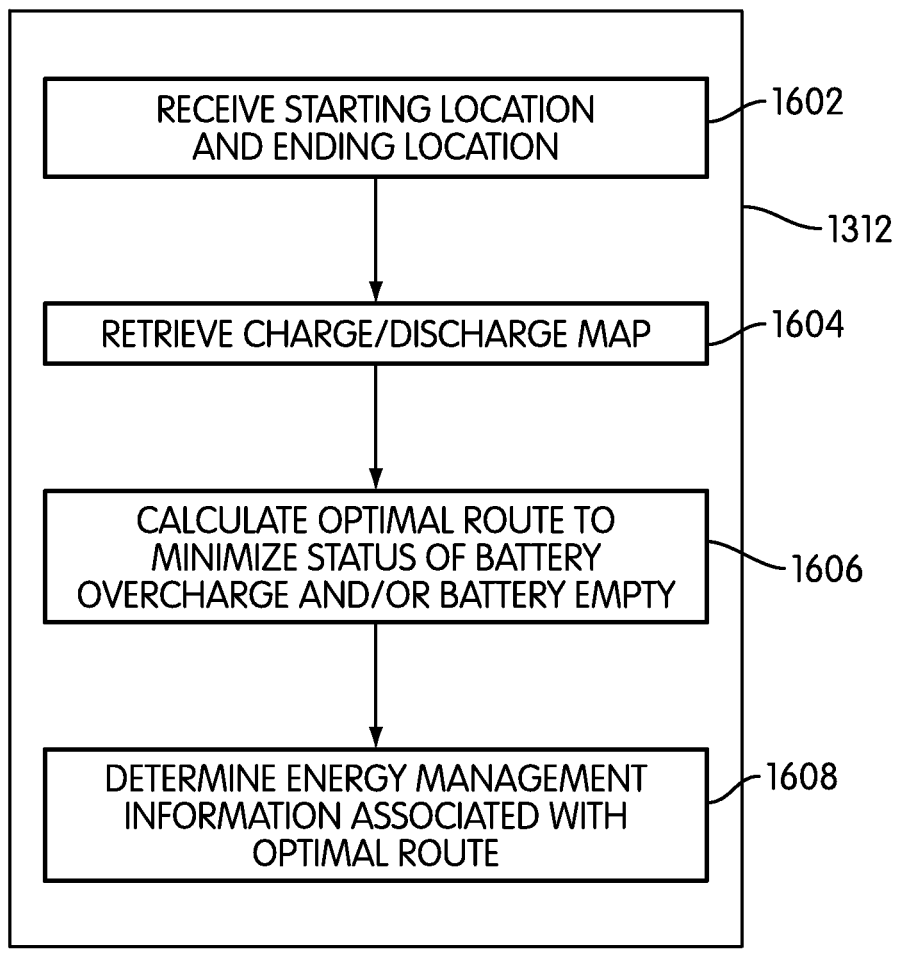
FIG. 16 is another embodiment of a process of preparing navigation information and energy management information.

FIG. 16 illustrates another embodiment of a process of preparing navigational information and energy management information. This detailed process may be used in situations where an energy map is a charge/discharge map related to the charge or discharge of a battery along various roadway segments. Initially, during step 1602, service provider 100 may receive a starting location and an ending location. Next, during step 1604, service provider 100 may retrieve a charge/discharge map. As previously discussed, a charge/discharge map may be stored in one or more databases associated with service provider 100 and can contain energy information related to energy discharged or energy recharged by a battery that powers an electric motor.

During step 1606, service provider 100 may calculate an optimal route that minimizes the status of both battery overcharge and battery empty. The term "battery overcharge" refers to a state of a battery in which the battery is fully charged and cannot accommodate further recharging. By minimizing battery overcharge and battery empty conditions, a vehicle more efficiently uses the engine and the electric motor to conserve fuel and reduce emissions. Generally, any known optimization algorithms can be used to calculate this kind of optimized route. During step 1608, service provider 100 may determine energy management information associated with the minimum electrical consumption route. In particular, service provider 100 may determine any information that may be utilized by a motor vehicle to control an electric motor while the motor vehicle travels on the optimal route.

Figure 17:
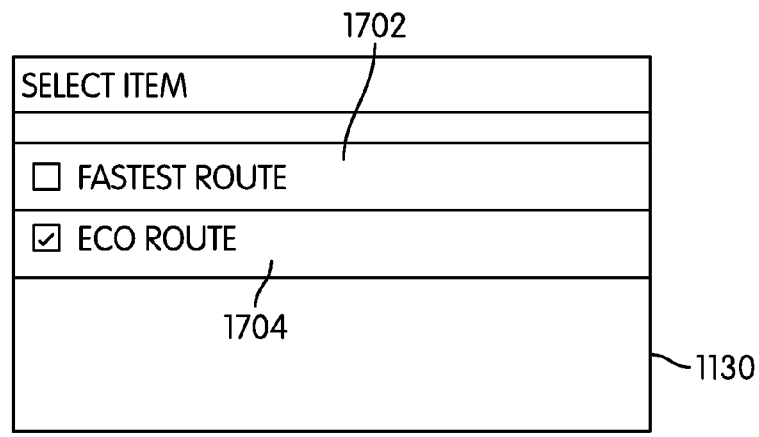
FIG. 17 is a schematic view of an embodiment of a display screen for a navigation system.

FIGS. 17 through 21 illustrate an embodiment of a method of managing navigation information. Referring to FIG. 17, a user may select a type of route from display screen 1130 of a navigation system. In traditional systems, the fastest routes between a starting point and an ending point are chosen. However, the current embodiment illustrates a system that allows a user to select between fastest route option 1702 and eco route option 1704 (or ecological route option 1704) that minimizes the amount of energy expended and/or reduces the amount of fuel consumed. By selecting an eco route, a user can save fuel costs and reduce emissions generated by a gasoline engine or other types of power sources that give off emissions.

Figure 18:
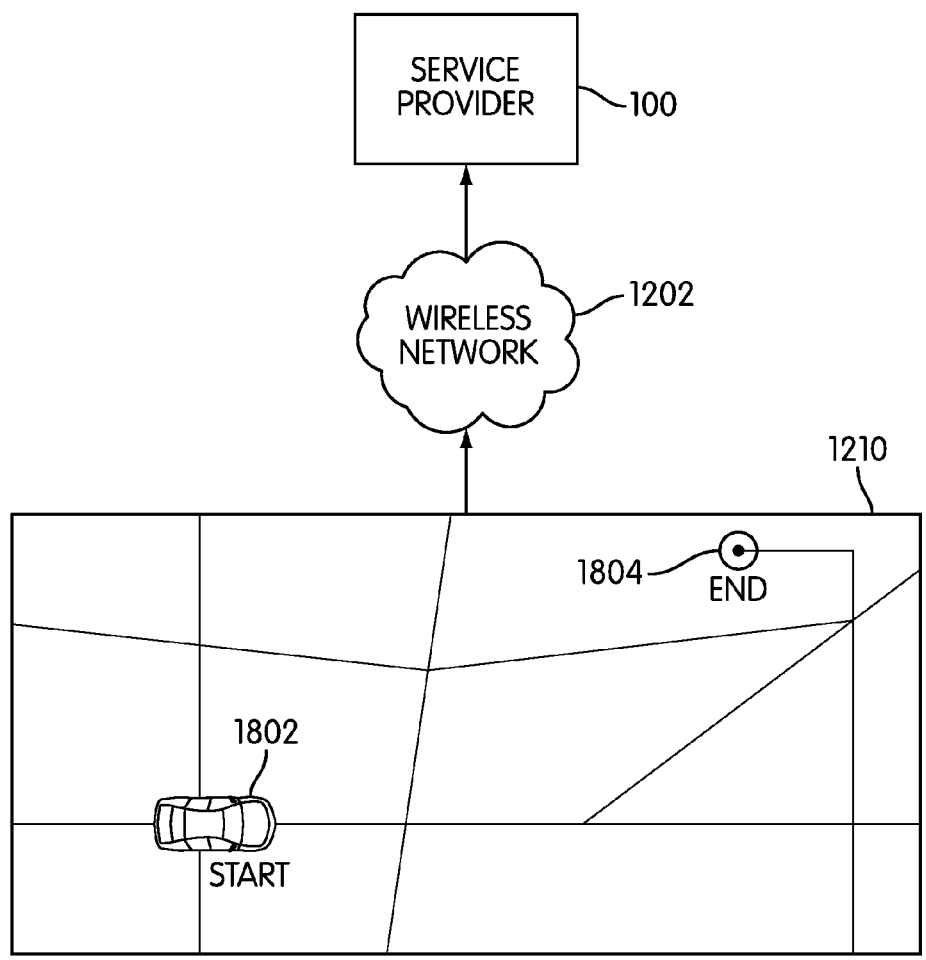
FIG. 18 is a schematic view of an embodiment of a process of submitting a navigation request.

FIG. 18 illustrates an embodiment of a navigation request being sent to a service provider. In particular, navigation system 1210 has received starting point 1802 and ending point 1804 from a user and/or a GPS receiver. Furthermore, a user has requested a route between starting point 1802 and ending portion 1804 that is a minimum energy route. A navigation request is then sent over wireless network 1202 to service provider 100, as previously discussed.

Figure 19:
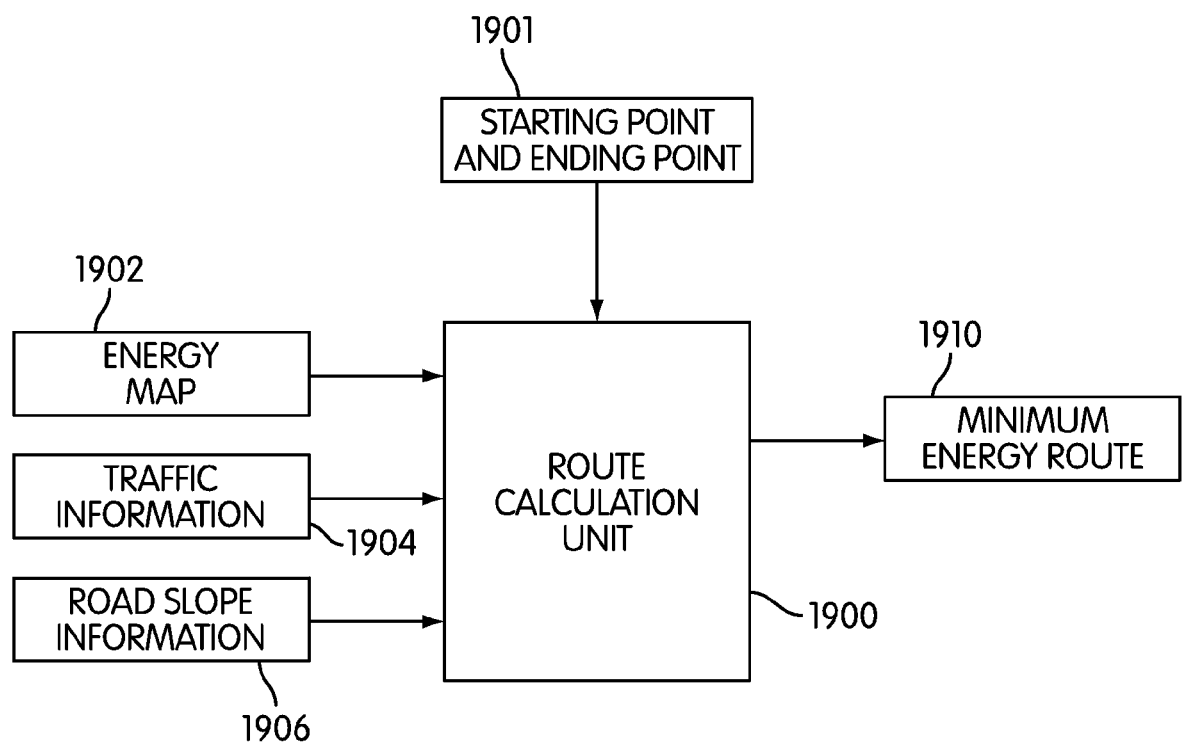
FIG. 19 is a schematic view of an embodiment of a method of determining a minimum energy route.

FIG. 19 illustrates a schematic view of an embodiment of a route calculation unit 1900. Route calculation unit 1900 may receive various inputs and produces as an output minimum energy route 1910. As an example, the current embodiment illustrates several possible inputs. Route calculation unit 1900 may receive user starting point and ending point information 1901. This information may be associated with the current location of the user and the destination of the user. In some cases, route calculation unit 1900 may receive information from energy map 1902. In some cases, this information can be obtained from one or more databases including a map database and an energy database. Also, route calculation unit 1900 may receive traffic information 1904. Traffic information 1904 can include traffic speed information along various roadways as well as real-time or average traffic congestion information. In some cases, route calculation unit 1900 may also receive roadway information such as road slope information 1906. It will be understood that in other embodiments, other types of input could be received by route calculation unit 1900.

It will be understood that route calculation unit 1900 can be any type of calculation unit. Algorithms for optimizing routes are known in the art. In an exemplary embodiment, route calculation unit 1900 comprises one or more algorithms that are configured to optimize routes between a starting point and an ending point.

Figure 20:
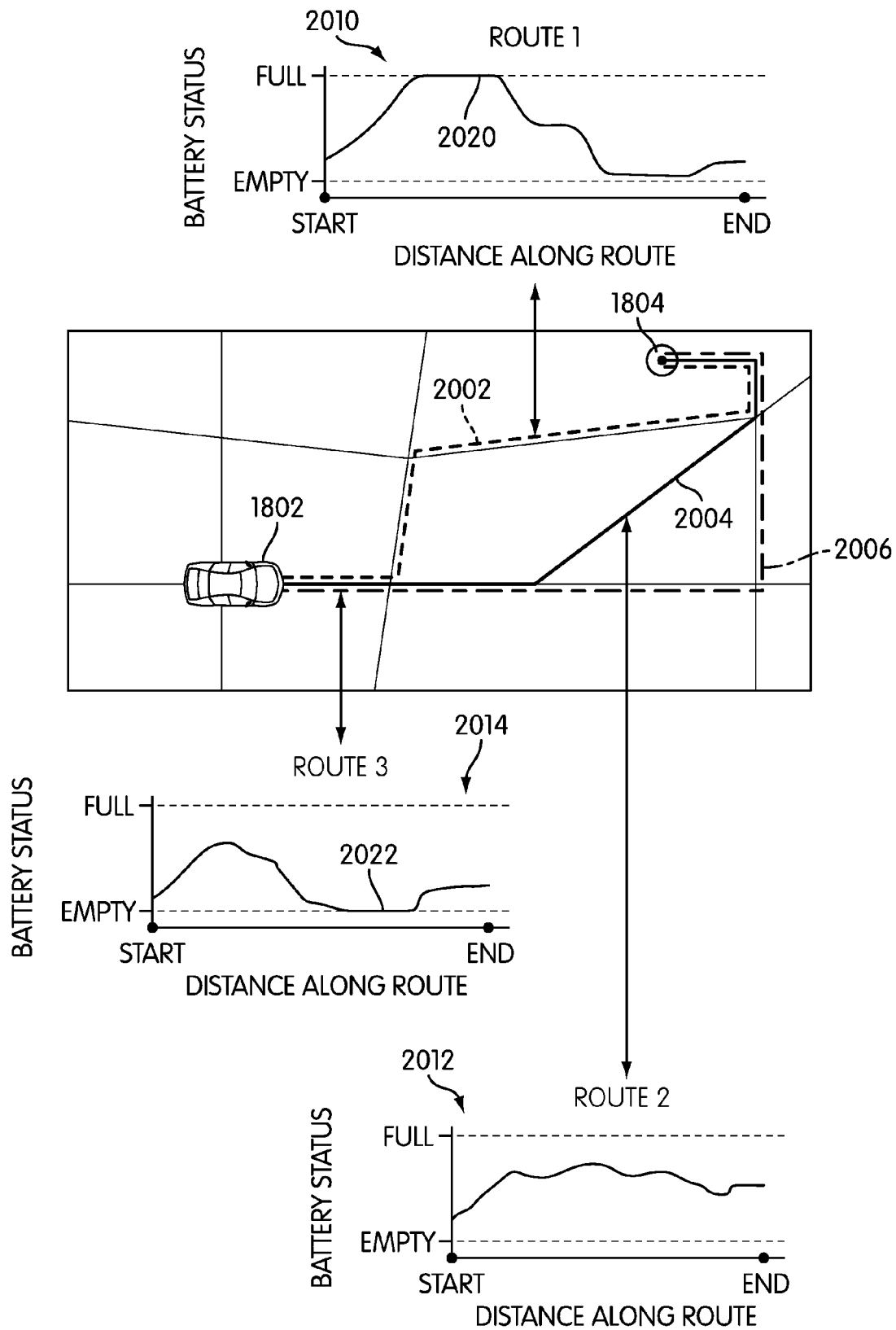
FIG. 20 is a schematic view of an embodiment of a process of determining a minimum energy route.

FIG. 20 illustrates a schematic view of an embodiment of a method of selecting an optimized route that minimizes energy use. Referring to FIG. 20, a route calculation unit may calculate three possible routes between starting point 1802 and ending point 1804. In particular, the route calculation unit may calculate first route 2002, second route 2004 and third route 2006.

In this example, route calculating unit 1900 may be configured to select a route that minimizes over charge and battery empty conditions for a battery. For example, first route 2002 is associated with first battery status profile 2010, second route 2004 is associated with second battery status profile 2012 and third route 2006 is associated with third battery status profile 2014. In this case, first battery status profile 2010 is associated with battery overcharge period 2020. In addition, third battery status profile 2014 is associated with battery empty period 2022. In contrast, second battery status profile 2012 is not associated with any periods of battery overcharge or battery undercharge. In other words, second route 2004 is the route that minimizes the amount of battery overcharge and battery overcharge. Therefore, the route calculation unit may select second route 2004 as the optimal or minimum energy route.

Figure 21:
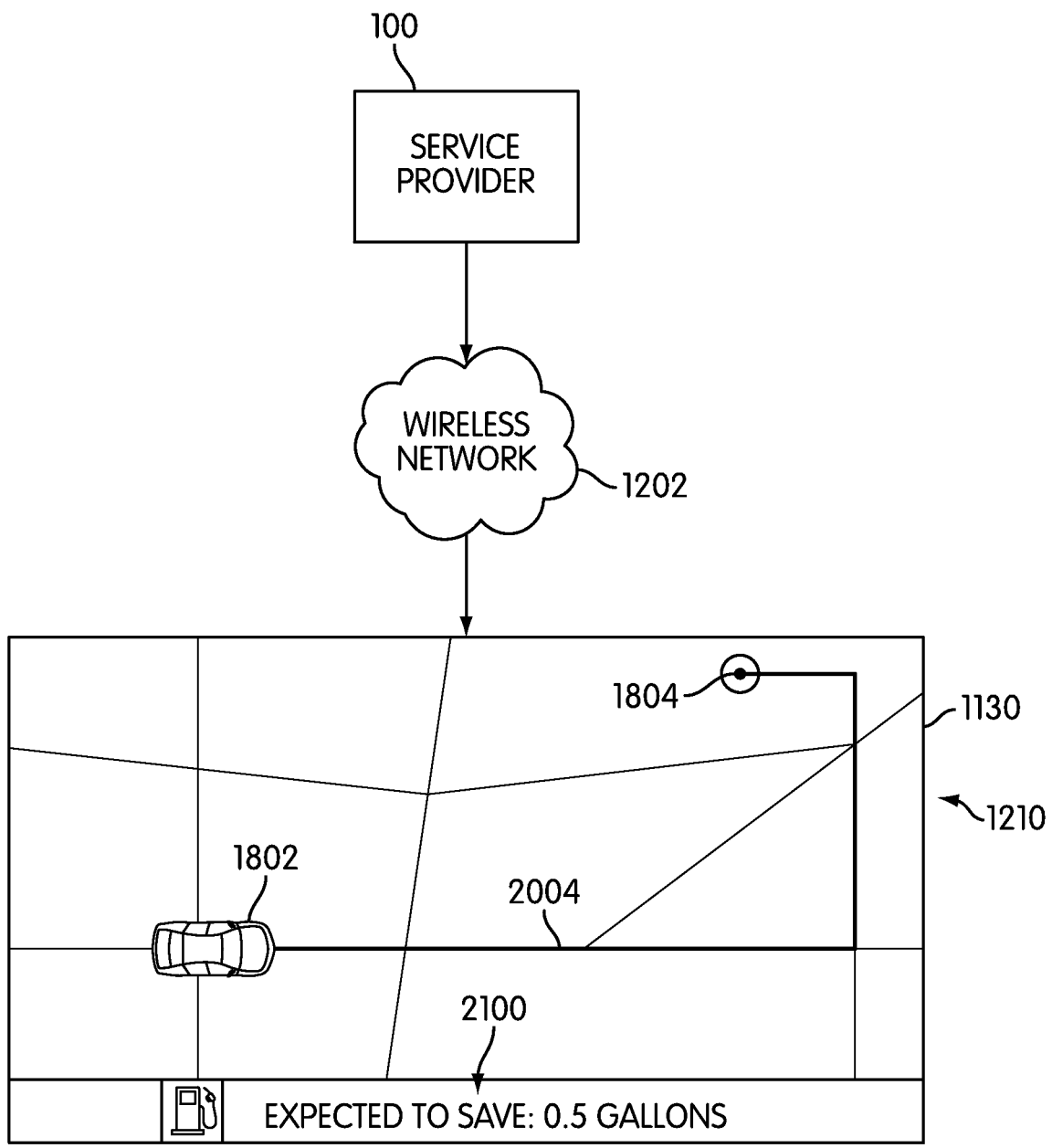
FIG. 21 is a schematic view of an embodiment of a process of receiving navigation information and energy management information.

Referring to FIG. 21, service provider 100 sends navigation information and energy management information back to navigation system 1210 of motor vehicle 1102. In this case, the navigation information is displayed on display screen 1130. Furthermore, the displayed route corresponds to second route 2004 which is the minimum energy route calculated by service provider 100. At this point, the navigation system can start providing directions to a user to travel on second route 2004 towards ending point 1804.

In some embodiments, a system may be configured to display energy savings information 2100. In this case, energy savings information 2100 can include information related to the amount gasoline saved. In other cases, however, the energy savings information can be used to display the amount of electricity saved. In still other cases, the energy savings information can be used to display the amount of fuel saved associated with a fuel cell of some kind.

In order to minimize the energy consumed on a route provided by a service provider, a motor vehicle may use energy management information that is associated with a minimum energy route to control one or more power sources. As previously discussed, energy management information can include various information associated with a predetermined route that allows a vehicle to optimize the use of energy and reduce overall energy consumption.

Figures 22, 23:
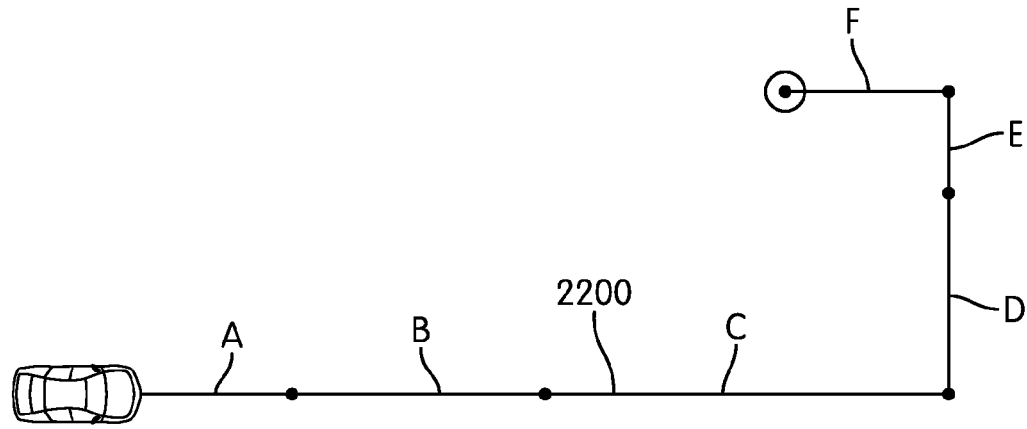
FIG. 22 is a schematic view of an embodiment of a navigation route configured to optimize energy consumption.
FIG. 23 is a schematic view of an embodiment of a table of energy management information.

FIGS. 22 and 23 illustrate a schematic embodiment of minimum energy route 2200 and energy management information table 2300 that is associated with minimum energy route 2200. Referring to FIGS. 22 and 23, minimum energy route 2200 comprises a plurality of roadway segments A, B, C, D, E and F. These segments are reproduced within energy management information table 2300. Furthermore, additional information associated with each of these segments is provided in table 2300. Specifically, each of the segments are listed in first row 2302. Furthermore, charge/discharge information is indicated in second row 2304, slope information is indicated in third row 2306, congestion information is indicated in fourth row 2308 and fuel use information is indicated in fifth row 2310.

The information provided in table 2300 may be used by a motor vehicle to precisely control the use of an electric motor and an engine as it travels on minimum energy route 2200. Examples are discussed in detail below. However, it should be understood that the types of information listed in the current embodiment are optional. In other cases, some of these types of information can be removed, while other types of information can be added.

Figure 24:
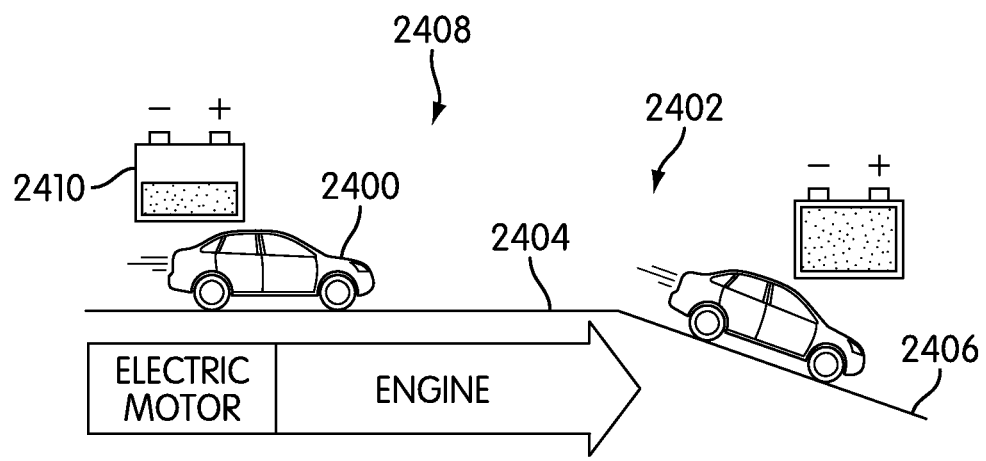
FIG. 24 is a schematic view of an embodiment of a method of controlling a motor vehicle on a predetermined route.
Figure 25:
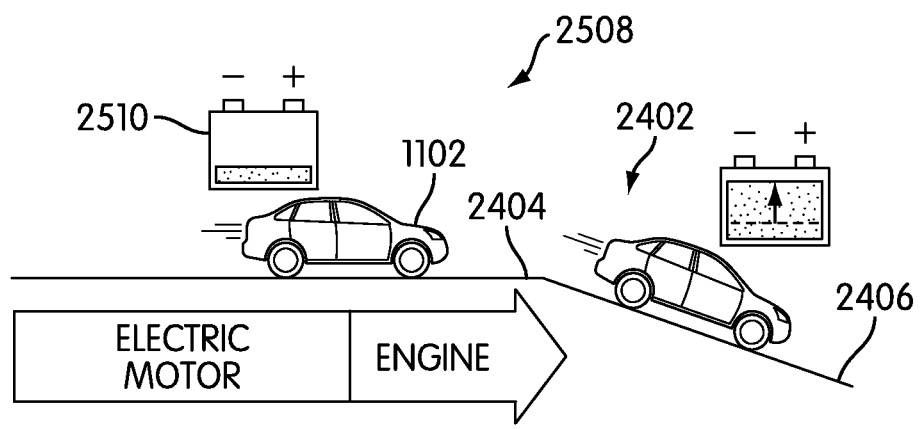
FIG. 25 is a schematic view of an embodiment of a method of controlling a motor vehicle on a predetermined route.

FIGS. 24 and 25 illustrate embodiments of motor vehicles traveling on a predetermined route. In particular, FIG. 24 illustrates an embodiment of motor vehicle 2400 traveling on route 2402 without any access to energy management information and FIG. 25 illustrates an embodiment of motor vehicle 1102 traveling on the same route with access to energy management information.

Referring to FIG. 24, motor vehicle 2400 initially travels on flattened roadway segment 2404 using energy from an electric motor and switches to using energy from the engine at first location 2408 to avoid reducing the battery charge below a predetermined margin. At this point, the battery is half charged as shown by state of charge indicator 2410. Furthermore, motor vehicle 2400 may travel down sloped roadway segment 2406, which slopes downwardly. As motor vehicle 2400 travels on sloped roadway segment 2406, the battery is overcharged. This results in a loss of energy that could have been recharged along sloped roadway segment 2406. In this embodiment, the lack of energy management information prevents motor vehicle 2400 from efficiently using the engine and motor over both flattened roadway segment 2404 and sloped roadway segment 2406 to minimize energy use.

Referring to FIG. 25, motor vehicle 1102 has access to energy management information that may be utilized to make decisions in operating the engine and/or electric motor. In this case, motor vehicle 1102 is initially traveling on flattened roadway segment 2404 using energy from an electric motor. In addition, the energy management information provided to motor vehicle 1102 indicates that motor vehicle 1102 is approaching sloped roadway segment 2406. Therefore, motor vehicle 1102 may make use of the electric motor for a longer period of time since the battery can be recharged at sloped roadway segment 2406. In particular, motor vehicle 1102 may reduce the lower margin of battery charge since information is provided about an upcoming down slope. In this case, motor vehicle 1102 switches to the engine at second location 2508. At second location 2508, the state of charge is close to empty as indicated by state of charge indicator 2510. Following this, the battery can recharge on sloped roadway segment 2406. This arrangement helps to reduce fuel consumption by increasing the amount of time that the electric motor is used along a route. In particular, when using the above described methods a motor vehicle can optimize the use of the electric motor and the battery along a predetermined route to minimize the amount of fuel used on the route.

Figure 26:
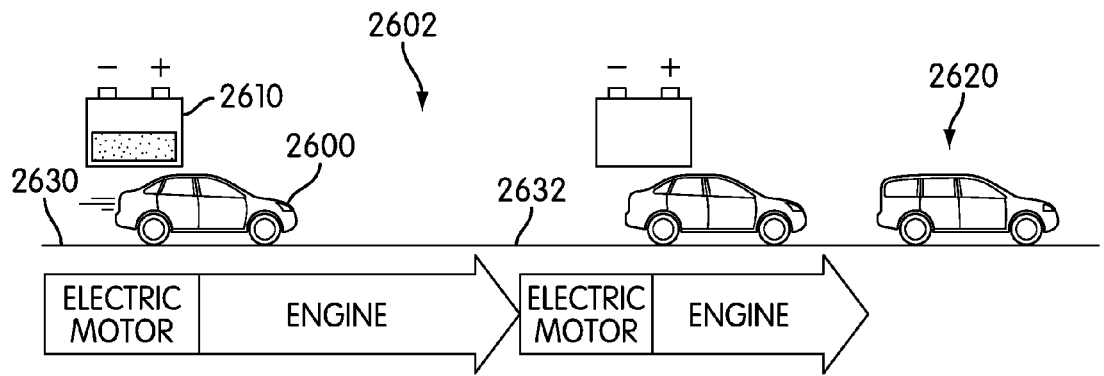
FIG. 26 is a schematic view of an embodiment of a method of controlling a motor vehicle on a predetermined route.
Figure 27:
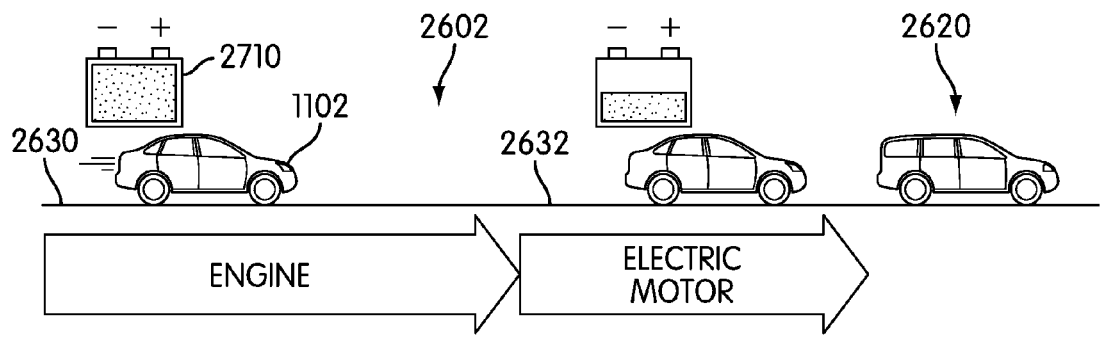
FIG. 27 is a schematic view of an embodiment of a method of controlling a motor vehicle on a predetermined route.

FIGS. 26 and 27 illustrate embodiments of motor vehicles traveling on a predetermined route. In particular, FIG. 26 illustrates an embodiment of motor vehicle 2600 traveling on route 2602 without any access to energy management information and FIG. 27 illustrates an embodiment of motor vehicle 1102 traveling on the same route with access to energy management information.

Referring to FIG. 26, route 2602 may be divided into high speed segment 2630 and low speed segment 2632 that is associated with traffic congestion 2620. Motor vehicle 2600 initially travels on high speed segment 2630 using a combination of the electric motor and the engine. While traveling on high speed segment 2630, the battery is discharged to a predetermined lower margin of batter charge, as indicated by state of charge indicator 2610. As motor vehicle 2600 travels through low speed segment 2632 that is associated with traffic congestion 2620, motor vehicle 2600 may be powered by the battery for a short period of time until the battery is empty. Once the battery is empty, motor vehicle 2600 may be powered by the engine. However, the engine is less efficient at the lower speeds that occur in congestion and therefore motor vehicle 2600 is unable to use the engine and the motor most efficiently on route 2602.

In contrast, referring to FIG. 27, motor vehicle 1102 has access to energy management information that may be utilized to make decisions in operating the engine and/or electric motor. In this case, motor vehicle 1102 travels on high speed segment 2630 using only the engine, since the energy management information indicates that motor vehicle 1102 is approaching low speed segment 2632 that is associated with traffic congestion 2620. In other words, the battery stays fully charged throughout high speed segment 2630 as indicated by state of charge indicator 2710. This allows motor vehicle 1102 to run on battery power throughout the entirety of low speed segment 2632. With this configuration, motor vehicle 1102 may be powered by the engine at higher speeds where the engine is most efficient and by the electric motor at lower speeds where the electric motor is most efficient.

In some embodiments, a motor vehicle can include provisions for calculating minimum energy routes directly, rather than requesting minimum energy routes from a remote service provider. In some cases, a motor vehicle can be provided with an onboard database that includes map information and energy information.

Figure 28:
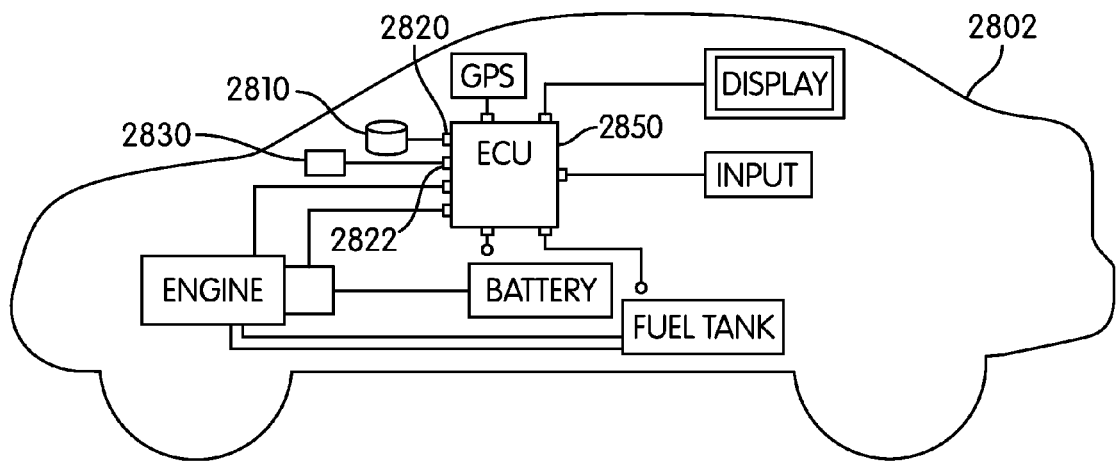
FIG. 28 is a schematic view of an embodiment of a motor vehicle including an onboard map database.

FIG. 28 illustrates another embodiment of motor vehicle 2802. Motor vehicle 2802 can be provided with substantially similar provisions to the embodiment discussed above and illustrated in FIG. 11 including ECU 2850 that is substantially similar to ECU 1150 of the previous embodiment. In this case, motor vehicle 2802 can be provided with onboard database 2810. In some cases, database 2810 can include mapping information. In other cases, database 2810 can include energy information. In an exemplary embodiment, database 2810 can include mapping information and energy information.

Motor vehicle 2802 can also include route calculating unit 2830 which is capable of calculating various kinds of routes according to navigational information and energy information. In some cases, route calculating unit 2830 may be separate from ECU 2850. In other cases, route calculating unit 2830 may be embedded within ECU 2850. Furthermore, in some cases, route calculating unit 2830 may be directly connected to database 2810.

In this case, ECU 2850 can include port 2820 for communicating with database 2810. In particular, ECU 2850 may be configured to send information to database 2810 and receive information from database 2810. ECU 2850 can also include port 2822 for communicating with route calculating unit 2830. Using this arrangement, motor vehicle 2850 may be capable of calculating minimum energy routes and providing a user with navigation information related to the minimum energy routes. Furthermore, motor vehicle 2802 may be configured to calculate energy management information associated with a minimum energy route for controlling one or more power sources along the minimum energy route.

Figure 29:
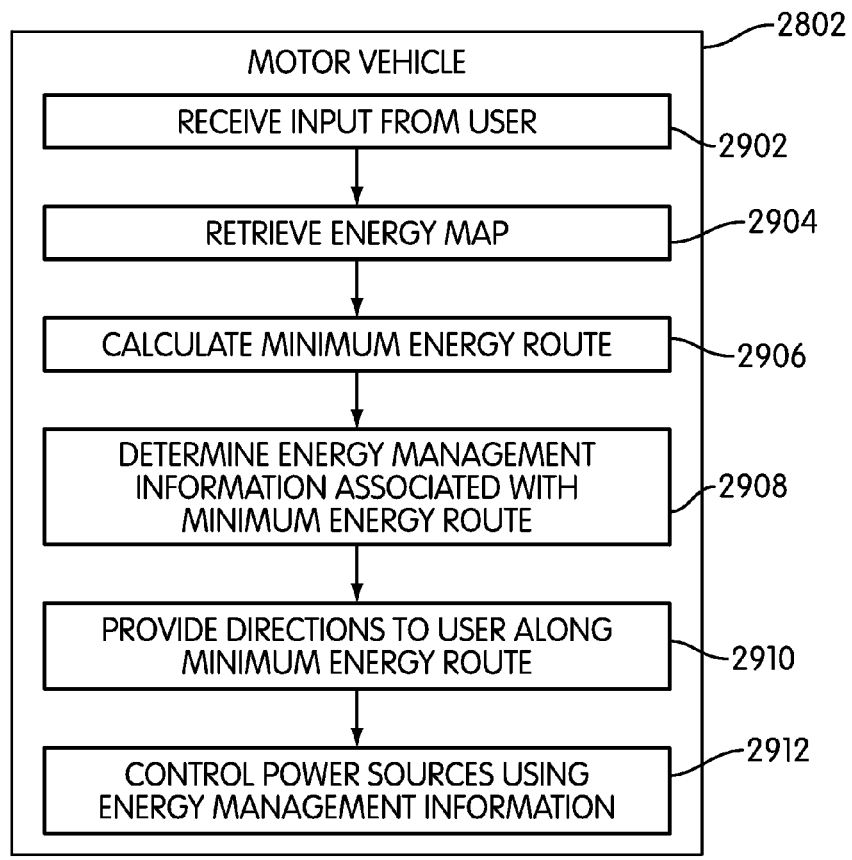
FIG. 29 is an embodiment of a process of determining navigation information and energy management information for a motor vehicle.

FIG. 29 illustrates an embodiment of a method of determining a minimum energy route and energy management information. In this case, each of the following steps are performed by one or more resources of motor vehicle 2802. In particular, in some cases, one or more of the following steps may be performed by ECU 2850. It will be understood that in other embodiments, some of these steps could be optional.

During step 2902, input from a user may be received. In particular, a starting location and an ending location can be received. In some cases, the starting location can be received directly from a GPS receiver. Next, during step 2904, an energy map can be retrieved. In this case, ECU 2850 or route calculating unit 2830 may receive information from database 2810 (see FIG. 28).

During step 2906, a minimum energy route can be calculated by route calculation unit 2830. Next, during step 2908 energy management information can be determined that corresponds to the minimum energy route. In some cases, this information can be determined by route calculating unit 2830. In other cases, this information can be determined by ECU 2850. In still other cases, this information can be determined by another calculating unit.

During step 2910 directions may be provided to a user that correspond to the minimum energy route. In some cases, the directions can be displayed for the user. Following this, during step 2912, one or more power sources can be controlled using the energy management information. In the exemplary embodiment, the energy management information can be used to control the engine and the electric motor.

It will be understood that the principles discussed above are not limited to use with hybrid vehicles that utilize two or more different power sources. Instead, these principles can be used in conjunction with vehicles powered by a single power source. Examples include vehicles powered only by a combustible fuel using an engine and vehicles powered only by a battery using an electric motor. In these cases, an energy map used for calculating minimum energy routes may only include information related to a single power source associated with the motor vehicle. For example, to calculate a minimum electrical consumption route for an electric vehicle, a charge/discharge map can be used by a server. Likewise, to calculate a minimum gasoline consumption route, a gasoline consumption map can be used by a server.

While various embodiments have been described, the description is intended to be exemplary, rather than limiting and it will be apparent to those of ordinary skill in the art that many more embodiments and implementations are possible that are within the scope of the claims. Accordingly, the embodiments are not to be restricted except in light of the attached claims and their equivalents. Also, various modifications and changes may be made within the scope of the attached claims.

What is claimed is:

1. A method of operating a navigation system including a computer system in communication with at least one database, the computer system being configured to perform the steps of:
   receiving a minimum energy route request from an electronic control unit of a motor vehicle, the request including a starting location and an ending location;
   retrieving information from an energy map stored in the at least one database, the energy map including energy information related to a first power source and a second power source that is different from the first power source;
   calculating a minimum energy route between the starting location and the ending location that minimizes a total energy consumed by the combination of the first power source and the second power source;
   sending information related to the minimum energy route to the electronic control unit;
   wherein the minimum energy route includes a plurality of road segments; and
   wherein the retrieved information from the energy map includes energy information for the first power source and the second power source for the plurality of road segments.

2. The method according to claim 1, wherein the minimum energy route is a route that minimizes the total energy consumed by one of the first power source and the second power source for each road segment of the plurality of road segments.

3. The method according to claim 1, wherein the minimum energy route is a route that minimizes the energy consumed by the first power source and the second power source over the entire route from the starting location to the ending location.

4. The method according to claim 1, wherein the minimum energy route is calculated using the energy information for the first power source and the second power source for each road segment of the plurality of road segments from the starting location to the ending location.

5. The method according to claim 1, wherein the first power source is a combustible fuel associated with an engine and wherein the second power source is a battery associated with an electric motor.

6. A method of operating a motor vehicle, the motor vehicle including a navigation system configured to perform the steps of:
   receiving a starting location and an ending location;
   retrieving information from an energy map stored in a database in communication with the navigation system, the energy map including energy information related to a plurality of different power sources;
   calculating a minimum energy route between the starting location and the ending location that minimizes the energy consumed by at least one of the power sources of the plurality of different power sources;
   providing directions to the user for guiding the vehicle to the ending location along the minimum energy route;
   wherein the minimum energy route includes a plurality of road segments;
   wherein the retrieved information from the energy map includes energy information for each of the first power source and the second power source for the plurality of road segments; and
   wherein the minimum energy route is calculated based on the energy information for the first power source and the second power source for each road segment of the plurality of road segments from the starting location to the ending location.

7. The method according to claim 6, wherein the plurality of different power sources includes at least two power sources.

8. The method according to claim 7, wherein the minimum energy route is a route that minimizes a total energy consumed by a combination of the at least two power sources.

9. The method according to claim 8, wherein the at least two power sources include a combustible fuel and a battery.

10. The method according to claim 1, wherein the information related to the minimum energy route sent to the electronic control unit includes information associated with using the first power source when the motor vehicle is traveling through a first roadway segment of the plurality of roadway segments and information associated with using the second power source when the motor vehicle is traveling through a second roadway segment of the plurality of roadway segments.

11. The method according to claim 10, wherein the first roadway segment is configured to minimize the energy consumed by the first power source and wherein the second roadway segment is configured to minimize the energy consumed by the second power source.

12. The method according to claim 10, wherein the first roadway segment is associated with a high vehicle speed and wherein the second roadway is associated with a low vehicle speed.

13. The method according to claim 6, wherein the minimum energy route is a route that minimizes the total energy consumed by one of the first power source and the second power source for each road segment of the plurality of road segments.

14. The method according to claim 6, wherein the minimum energy route is a route that minimizes the energy consumed by the first power source and the second power source over the entire route from the starting location to the ending location.

15. The method according to claim 6, wherein the directions to the user for guiding the vehicle includes information associated with using the first power source when the motor vehicle is traveling through a first roadway segment of the plurality of roadway segments and information associated with using the second power source when the motor vehicle is traveling through a second roadway segment of the plurality of roadway segments.

16. The method according to claim 15, wherein the first roadway segment is configured to minimize the energy consumed by the first power source and wherein the second roadway segment is configured to minimize the energy consumed by the second power source.

17. The method according to claim 15, wherein the first roadway segment is associated with a high vehicle speed and wherein the second roadway is associated with a low vehicle speed.

* * * * *